US007080779B2

(12) United States Patent
Cummings

(10) Patent No.: US 7,080,779 B2
(45) **Date of Patent: *Jul. 25, 2006**

(54) BALLOT MARKING SYSTEM AND APPARATUS

(75) Inventor: Eugene M. Cummings, Lake Forest, IL (US)

(73) Assignee: AutoMARK Technical Systems, LLC, Chicago, IL (US)

( * ) Notice: Subject to any disclaimer, the term of this patent is extended or adjusted under 35 U.S.C. 154(b) by 99 days.

This patent is subject to a terminal disclaimer.

(21) Appl. No.: 10/733,112

(22) Filed: Dec. 11, 2003

(65) Prior Publication Data

US 2004/0140357 A1 Jul. 22, 2004

Related U.S. Application Data

(63) Continuation-in-part of application No. 10/454,276, filed on Jun. 4, 2003, and application No. 10/454,345, Jun. 4, 2003, which is a continuation-in-part of application No. 10/347,528, filed on Jan. 17, 2003.

(60) Provisional application No. 60/348,919, filed on Jul. 26, 2002.

(51) Int. Cl.
*G06K 17/00* (2006.01)
*G06F 11/00* (2006.01)

(52) U.S. Cl. .......................................... 235/386; 705/12

(58) Field of Classification Search ................ 235/375, 235/386; 705/12
See application file for complete search history.

(56) References Cited

U.S. PATENT DOCUMENTS

| | | | |
|---|---|---|---|
| 2,940,663 | A | 6/1960 | Fechter et al. |
| 3,218,439 | A | 11/1965 | Holzer et al. |
| 3,226,018 | A | 12/1965 | Railsback et al. |
| 3,233,826 | A | 2/1966 | Wiken |
| 3,441,714 | A | 4/1969 | Simjian |
| 3,620,587 | A | 11/1971 | Ahmann |
| 3,648,022 | A | 3/1972 | Cook |
| 3,653,587 | A | 4/1972 | Hammond et al. |

(Continued)

FOREIGN PATENT DOCUMENTS

| | | |
|---|---|---|
| JP | 07246732 A | 9/1995 |

OTHER PUBLICATIONS

Mercuri, Rebecca, A Better Ballot Box?, IEEE Spectrum, Oct. 2002, pp. 46-50, New York, New York, USA.

(Continued)

*Primary Examiner*—Thien M. Le
*Assistant Examiner*—April A. Taylor
(74) *Attorney, Agent, or Firm*—Cook, Alex, McFarron, Manzo, Cummings & Mehler, Ltd.

(57) ABSTRACT

A terminal for marking a paper ballot which lists a plurality of candidates and which includes a marking space for each candidate which can be either hand-marked by a voter, or machine-marked by the terminal. The terminal scans the ballot to determine the ballot format, and then presents candidate selection options to the voter visually utilizing an LCD touch screen and aurally utilizing a synthesized speech menu. Candidate selections entered utilizing the touch screen menu or utilizing the audio menu are marked on the front and back sides of the ballot in marking spaces corresponding to the selected candidates, and the ballot is returned to the voter in a form which enables the voter to visually confirm that his or her selections have been marked. The ballot, whether hand-marked or machine-marked, is inserted in a ballot scanning device, wherein the ballot is tallied and deposited in a ballot box.

60 Claims, 31 Drawing Sheets

U.S. PATENT DOCUMENTS

| | | | |
|---|---|---|---|
| 3,722,793 | A | 3/1973 | Aronoff |
| 3,733,469 | A | 5/1973 | Meyer |
| 4,021,780 | A | 5/1977 | Narey et al. |
| 4,066,871 | A | 1/1978 | Cason, Sr. et al. |
| 4,142,095 | A | 2/1979 | Cason, Sr. et al. |
| 4,236,066 | A | 11/1980 | Olmstead et al. |
| 4,373,134 | A | 2/1983 | Grace et al. |
| 4,479,194 | A | 10/1984 | Fogg et al. |
| 4,641,240 | A | 2/1987 | Boram |
| 4,649,264 | A | 3/1987 | Carson |
| 4,774,665 | A | 9/1988 | Webb |
| 4,807,908 | A | 2/1989 | Gerbel |
| 4,813,708 | A | 3/1989 | Narey |
| 4,981,259 | A | 1/1991 | Ahmann |
| 5,072,999 | A | 12/1991 | Trotta et al. |
| 5,189,288 | A | 2/1993 | Anno et al. |
| 5,213,373 | A | 5/1993 | Ramos |
| 5,218,528 | A | 6/1993 | Wise et al. |
| 5,248,872 | A | 9/1993 | Stewart |
| 5,278,753 | A | 1/1994 | Graft, III |
| 5,377,099 | A | 12/1994 | Miyagawa |
| 5,497,318 | A | 3/1996 | Miyagawa et al. |
| 5,535,118 | A | 7/1996 | Chumbley |
| 5,583,329 | A | 12/1996 | Davis, III et al. |
| 5,585,612 | A | 12/1996 | Harp, Jr. |
| 5,610,383 | A | 3/1997 | Chumbley |
| 5,635,726 | A | 6/1997 | Zavislan et al. |
| 5,666,765 | A | 9/1997 | Sarner et al. |
| 5,732,222 | A | 3/1998 | Miyagawa et al. |
| 5,758,325 | A | 5/1998 | Lohry et al. |
| 5,764,221 | A | 6/1998 | Willard |
| 5,821,508 | A | 10/1998 | Willard |
| 5,875,432 | A | 2/1999 | Sehr |
| 5,878,399 | A | 3/1999 | Peralto |
| 6,078,902 | A | 6/2000 | Schenkler |
| 6,079,624 | A | 6/2000 | Apperson et al. |
| 6,081,793 | A | 6/2000 | Challener et al. |
| 6,134,399 | A | 10/2000 | Hino et al. |
| 6,194,698 | B1 | 2/2001 | Zavislan et al. |
| 6,250,548 | B1 | 6/2001 | McClure et al. |
| 6,412,692 | B1 | 7/2002 | Miyagawa |
| 6,457,643 | B1 | 10/2002 | Way |
| 6,694,045 | B1 | 2/2004 | Chung |
| 6,769,613 | B1 | 8/2004 | McDermott et al. |
| 2001/0013547 | A1 | 8/2001 | Kotob et al. |
| 2001/0034640 | A1 | 10/2001 | Chaum |
| 2001/0035455 | A1 | 11/2001 | Davis et al. |
| 2002/0038819 | A1 | 4/2002 | Ushioda et al. |
| 2002/0066780 | A1 | 6/2002 | Balolia |
| 2002/0074399 | A1 | 6/2002 | Hall et al. |
| 2002/0075246 | A1 | 6/2002 | Zheltukhin |
| 2002/0077885 | A1 | 6/2002 | Karro et al. |
| 2002/0077886 | A1 | 6/2002 | Chung |
| 2002/0078358 | A1 | 6/2002 | Neff et al. |
| 2002/0084325 | A1 | 7/2002 | Reardon |
| 2002/0087394 | A1 | 7/2002 | Zhang |
| 2002/0092908 | A1 | 7/2002 | Chumbley |
| 2002/0107724 | A1 | 8/2002 | Openshaw, II et al. |
| 2002/0133396 | A1 | 9/2002 | Barnhart |
| 2002/0134844 | A1 | 9/2002 | Morales |
| 2002/0138341 | A1 | 9/2002 | Rodriguez |
| 2002/0143610 | A1 | 10/2002 | Munyer |
| 2002/0161628 | A1 | 10/2002 | Poor et al. |
| 2003/0026462 | A1 | 2/2003 | Chung |
| 2003/0034393 | A1 | 2/2003 | Chung |
| 2003/0062411 | A1 | 4/2003 | Chung et al. |
| 2003/0136835 | A1 | 7/2003 | Chung |
| 2003/0173404 | A1 | 9/2003 | Chung |
| 2003/0178484 | A1 | 9/2003 | Vadura et al. |
| 2004/0046021 | A1 | 3/2004 | Chung |
| 2004/0140357 | A1 | 7/2004 | Cummings |
| 2004/0169077 | A1 | 9/2004 | Petersen et al. |
| 2004/0195323 | A1* | 10/2004 | Vadura et al. .............. 235/386 |
| 2004/0217168 | A1* | 11/2004 | Cummings .................. 235/386 |
| 2005/0211778 | A1* | 9/2005 | Biddulph .................... 235/386 |

OTHER PUBLICATIONS

DeCarvalho, Luiz Pinto, Electronic Elections, IEEE Spectrum, Feb. 2003, p. 15, New York, New York, USA.

Kofler, Robert; Krimmer, Robert; Prosser, Alexander, Electronic Voting: Algorithmic and Implementation Issues, IEEE Computer Society, New York, New York, USA.

Bellinger, Robert, Can We Be Spared a Repeat of Election 2000?, IEEE, Feb. 2001, pp. 1-3, New York, New York, USA.

* cited by examiner

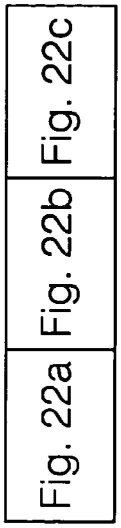
Fig. 22c
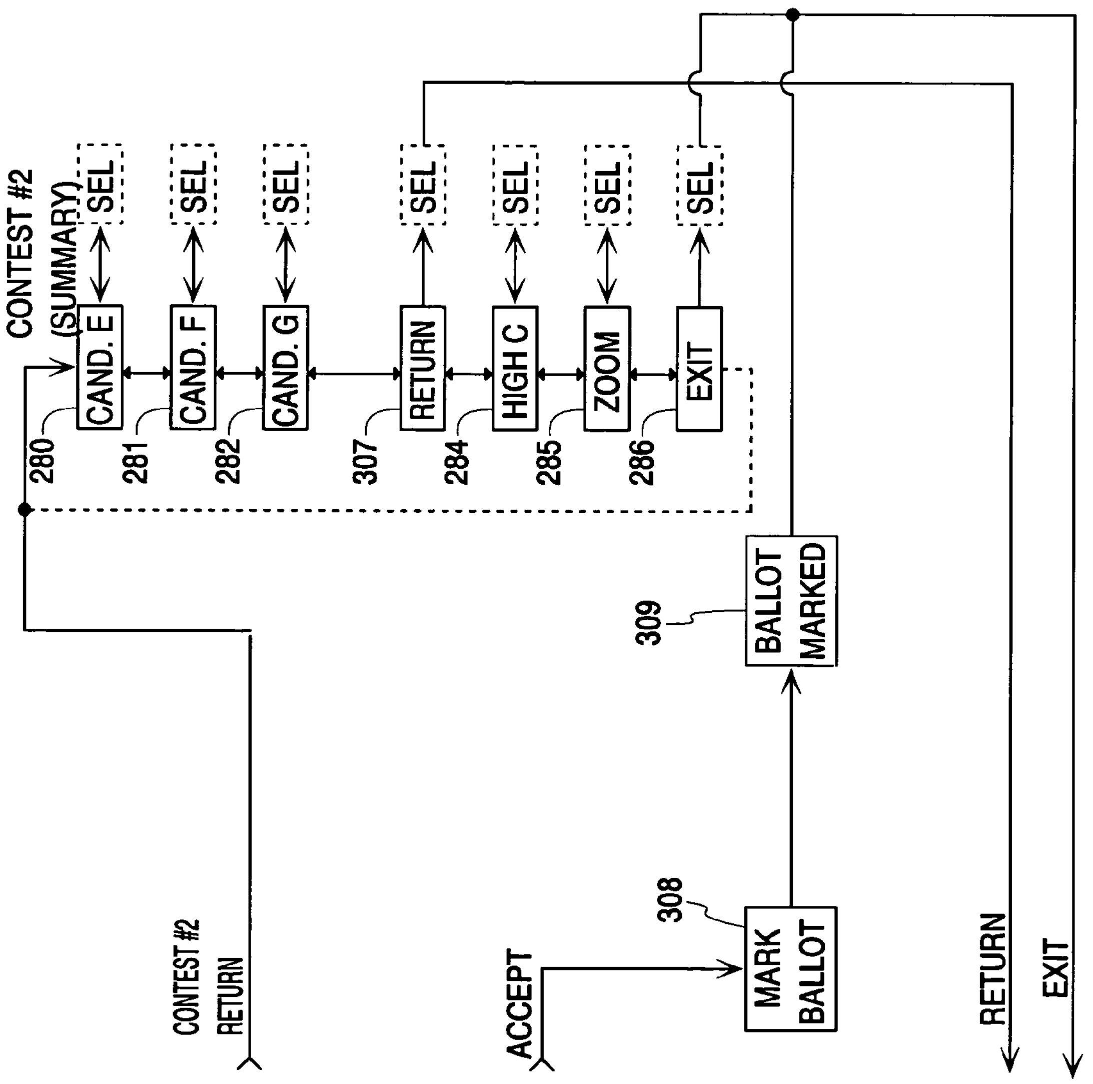

BALLOT MARKING SYSTEM AND APPARATUS

CROSS-REFERENCE TO RELATED APPLICATIONS

This application claims benefit as a Continuation-in-Part of application Ser. No. 10/454,276 filed Jun. 4, 2003 and application Ser. No. 10/454,345 filed Jun. 4, 2003, which claim benefit as Continuations-in-Part of application Ser. No. 10/347,528 filed Jan. 17, 2003, which claims benefit under 35 U.S.C. § 119(e) of U.S. Provisional Application, Ser. No. 60/348,919 filed Jul. 26, 2002, the complete disclosure thereof being incorporated by reference.

BACKGROUND OF THE INVENTION

Traditionally, elections for public office in the United States have been conducted with voting systems utilizing hand-marked paper ballots. Typically, in such systems a paper ballot is issued to a verified voter by an election judge. The voter takes the ballot to a voting booth, where he or she manually marks his or her selections by placing marks or punch holes in marking spaces associated with the candidates he or she selects. The marked ballot is then taken by the voter to a ballot box where it is inserted and stored for subsequent hand or machine counting.

In recent years, the traditional system has been improved with the use of a ballot scanner to tally the hand-marked ballots as they are inserted into the ballot box. This has the advantage of making vote tallies immediately available at the close of polling, and, with scanners so-equipped, of preventing unintentional under-votes and over-votes. However, one drawback of the traditional system remains in that there is no provision for assisting voters who have a physical impairment, which would interfere with the manual marking of a ballot. Previous attempts at assisting such impaired voters have utilized electronic voting terminals wherein, instead of presenting candidate choices on a paper ballot, candidate choices are serially presented to the voter on large, easily viewable touch-screen displays. When the voter has made his or her selections, the results are tallied within the voting terminal, the total votes for each candidate being read from the terminal electronically or by means of a paper tape at the close of the polling place.

One drawback of electronic voting terminals is that there is no satisfactory means for auditing the voting process, i.e. confirming that each vote is tallied as voted, and that no votes are tallied which were not voted. Furthermore, there is no means for an individual voter to confirm that his or her vote has actually been counted. Attempts at addressing these deficiencies have centered on the use of a paper tape or slip printed concurrently with each voter's voting. Such tapes and slips, which bear little or no resemblance to a ballot, have proven difficult to interpret by the voter and do not confirm that the vote has been actually tallied.

Accordingly, it is the general object of the invention to provide a new and improved voting system, method and apparatus.

It is a more specific object of the invention to provide an improved voting system method and apparatus wherein a pre-printed ballot which can be either hand-marked in a voting booth, or electronically marked at a voter-assist terminal by means of a visual or audio voter interface.

It is a more specific object of the present invention to provide a new and improved ballot marking system and apparatus wherein a pre-printed ballot is marked in accordance with voter selections made by a video or audio interface.

It is a further object of the present invention to provide a ballot marking apparatus which enables a voter having a physical impairment to mark a pre-printed ballot by means of a visual or audio interface.

SUMMARY OF THE INVENTION

The invention is generally directed to a voting system for recording a voter's selection of one candidate from a slate of one or more candidates, the system comprising: a hand-markable paper ballot adapted for receiving at least one voter-detectable mark indicating the voter's selection of a candidate from the slate of one or more candidates, the ballot providing the names of and an associated marking space for each candidate in the slate of candidates; a voter assist terminal for presenting to the voter one or more visual or audio menus presenting a choice of candidates from the slate of candidates and for receiving an input from the voter indicating the selection of a candidate from the slate of candidates; and marking the ballot in response to the voter input to the menus with a voter-detectable mark in the marking space corresponding to the selected candidate; and a ballot scanning device for receiving the ballot and recording the voter-detectable mark in the marking space associated with the selected candidate as a vote cast for the selected candidate.

The invention is further directed to a voting system for recording a voter's selection of one candidate from a slate of one or more candidates on a physical, hand-markable ballot adapted to receive at least one voter-detectable mark indicating the voter's selection of a candidate from the slate of one or more candidates, the ballot providing the names of and an associated marking space for each candidate in the slate of candidates, the ballot further being readable by a ballot scanning device receiving the ballot and recording the voter-detectable mark in the marking space associated with the selected candidate as a vote cast for the selected candidate; to the improvement comprising: a voter-assist terminal for presenting to the voter one or more visual or audio menus representing a choice of candidates from the slate of candidates, and for receiving an input from the voter indicating the selection of a candidate from the slate of candidates; and for marking the ballot in response to the voter input terminal by providing a voter-detectable mark in the marking space corresponding to the selected candidate.

The invention is further directed to a ballot marking terminal for use in conjunction with a hand-markable paper ballot adapted to receive at least one voter-detectable mark indicating a voter's selection of a candidate from a slate of one or more candidates, the ballot providing the names of and an associated marking space for each candidate in the slate of candidates, the voter-assist terminal presenting to the voter one or more visual or audio menus presenting a choice of candidates from the slate of candidates, and for receiving an input from the voter indicating the selection of a candidate from the slate of candidates, and marking the ballot in response to the voter input by providing a voter-detectable mark in the marking space corresponding to the selected candidate.

The invention is further directed to a ballot marking terminal for use in conjunction with a hand-marked paper ballot adapted to receive at least one voter-detectable mark indicating a voter's selection of a candidate from a slate of one or more candidates, the ballot providing the names of and an associated marking space for each candidate in the slate of candidates, the voter-assist terminal presenting to the voter one or more visual or audio menus presenting a choice of candidates from the slate of candidates, and means for receiving an input from the voter indicating the selection of a candidate from the slate of candidates, and including a ballot transport mechanism for receiving the ballot, and a ballot marking assembly responsive to the voter input for printing a voter-detectable mark in the marking space corresponding to the selected candidate.

The invention is further directed to a method for recording a voter's selection of one candidate from a slate of one or more candidates, comprising the steps of: providing a hand-markable paper ballot adapted to receive at least one voter-detectable mark indicating the voter's selection of a candidate from the slate of one or more candidates, the ballot providing the names of and an associated marking space for each candidate in the slate of candidates; presenting to the voter on a voter-assist terminal one or more menus providing a choice of candidates from the slate of candidates, and receiving an input from the voter indicating the selection of a candidate from the slate of candidates; marking with the voter-assist terminal, in response to the voter input to the voting terminal, a voter-detectable mark in the marking space corresponding to the selected candidate; and receiving the ballot in a ballot scanning device and providing the voter-detectable mark in the marking space associated with the selected candidate as a vote cast for the selected candidate.

BRIEF DESCRIPTION OF THE DRAWINGS

FIGS. 22*a*–22*c* show a simplified flowchart of the steps taken by the voter in utilizing visual and aural prompts provided by the ballot marking terminal to make selections from the contests on the ballot.

DESCRIPTION OF THE PREFERRED EMBODIMENT

Figure 1:
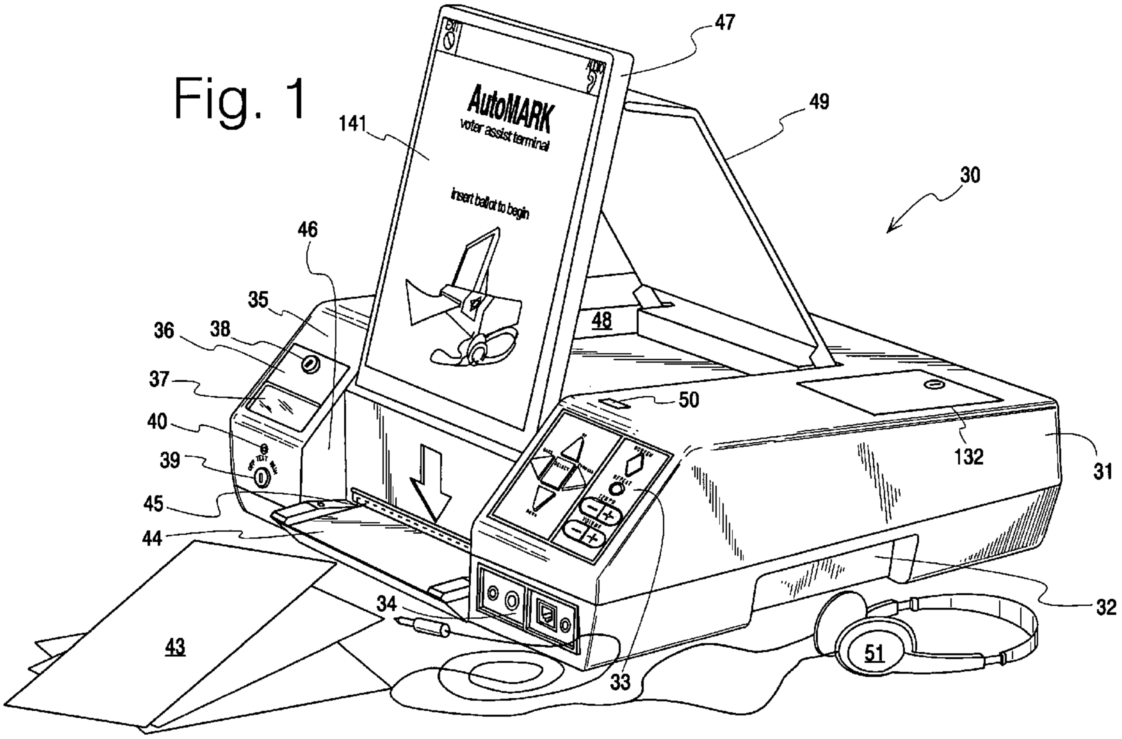
FIG. 1 is a perspective view of the ballot marking terminal invention constructed in accordance with the invention showing the terminal in an operating position.
Figure 2:
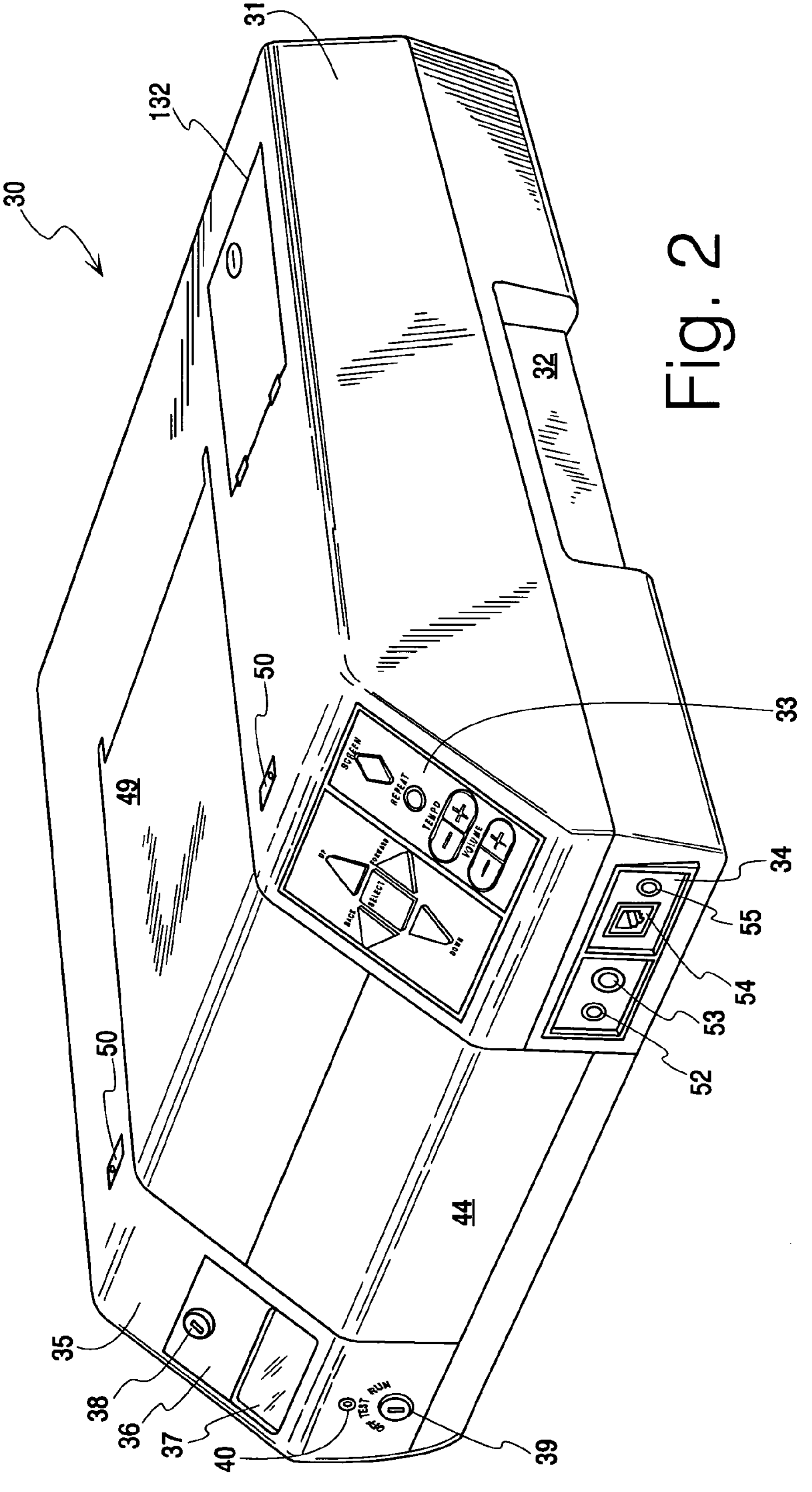
FIG. 2 is a perspective view of the ballot marking terminal of FIG. 1 showing the terminal in a closed position.

Referring to the figures, and particularly to FIGS. 1 and 2, a ballot marking terminal 30 is seen to include a generally rectangular housing 31 having a pair of opposed handle portions 32 to facilitate placing the terminal in an operating position on a table or other support surface (not shown). The front face of the terminal housing 31 includes on its right side a sloped voter interface panel 33 and a vertically disposed interconnect panel 34. Housing 31 further includes on the left side of its front surface a sloped panel 35 which includes an access door 36 for providing access to a memory card (not shown) in FIG. 1 installed within the terminal to provide data regarding the style or format of ballots to be received and processed by the terminal. The transparent window 37 in access door 36 enables the access card to be viewed from the exterior of the terminal so that installation of the proper access card can be readily confirmed. A key lock 38 in the access door prevents unauthorized access to the data card.

A three-position key switch 39 is provided on a vertical left side panel of housing 31 to enable the operating mode of ballot marking terminal 30 to be set. This key switch includes OFF, ON and TEST positions which can be selected by officials at the polling place and which the ballot marking terminal is being used. An LED status light 40 above key switch 39 indicates the powered-up status of the terminal. In a preferred embodiment, this light displays a steady green to indicate operation on an AC line power with a fully charged battery, or a blinking green to indicate operation on the AC line with an inadequately charged battery. During battery operation, the LED status light displays a steady amber with the battery adequately charged, or a blinking amber with the battery inadequately charged. A power switch (not shown) on the rear panel of housing 31 provides a positive disconnect of all power from the terminal.

To provide for insertion and discharge of a pre-printed ballot 43, housing 31 includes at its front end a ballot tray 44 which communicates with a ballot receiving slot 45 (FIG. 1) in the housing. Ballot receiving tray 44 is pivotally mounted to housing 31 such that it may be pivoted from its operating position shown in FIG. 1, to a closed position shown in FIG. 2. A suitably dimensioned recess 46 is provided in the front face of housing 31 to enable the ballot feed tray 44 to be pivoted to the closed position and to provide for a longer tray surface when the tray is in its operating position.

To provide a visual interface with a voter, ballot marking terminal 30 includes an LCD touch screen assembly 47 which is pivotally mounted to housing 31 such that the display can pivot from a closed position in a recess 48 provided in the top surface of the housing to a generally vertical operating position as shown in FIG. 1. A cover 49 pivotally mounted to housing 31 along its rear edge engages the rear surface of display assembly 47 to support the display assembly in its operating position as shown in FIG. 1, and pivots over recess 48 to cover display assembly 47 when the display assembly is stored in recess 48, as shown in FIG. 2. In the stored condition, ballot feed tray 44 is preferably pivoted into recess 46 prior to cover 49 being pivoted downwardly over display assembly 47. Cover 49 is dimensioned to extend over the top edge of feed tray 44 so that when cover 49 is in its closed position, feed tray 44 is effectively locked in its closed position. A pair of slide latches 50 may be provided on the top surface of housing 31 to lock cover 49 closed for transit. Alternatively, one or more latch assemblies (not shown) may be provided on the outer surfaces (when closed as in FIG. 2) of ballot feed tray 44 and cover 49 to lock two members together, thereby security the members for transit.

Figure 3:
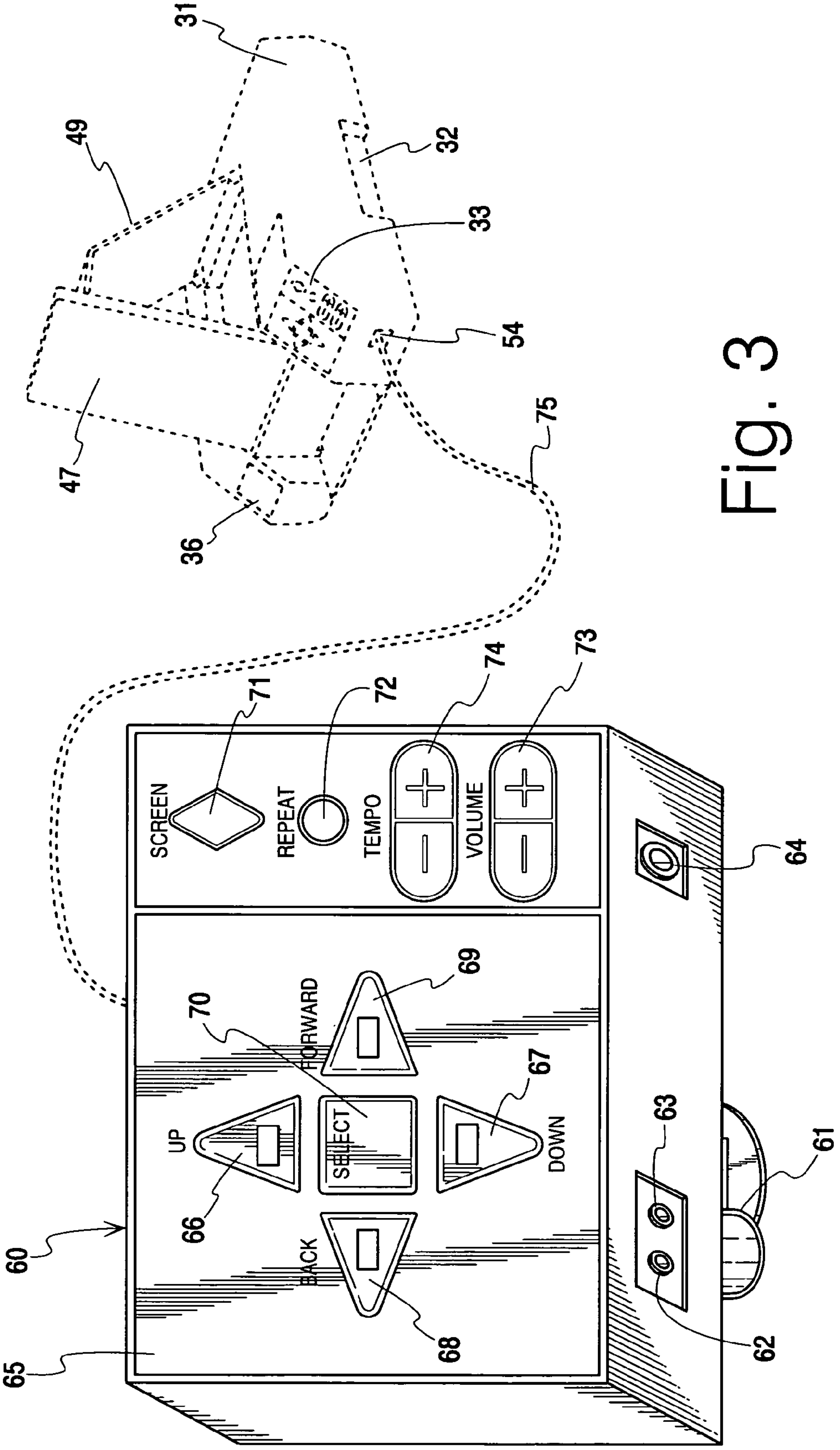
FIG. 3 is an enlarged perspective view of a remote user interface module for use with the ballot marking terminal of FIGS. 1 and 2.

An audio interface with the voter is provided by a pair of headphones 51 which plug into one of two audio jacks 52 and 53 (FIG. 2) on the front right surface of housing 31. Audio jack 52 is preferably a one-eighth inch jack and audio jack 53 is preferably a one-quarter inch jack. An additional jack 54 is provided for connection to a remote voter interface module such as shown in FIG. 3. An additional ADA jack 55 provides for connection to a two-contact “sip and puff” device.

Referring to FIG. 3, a remote voter interface module 60 may be optionally provided to permit voters to perform functions provided by voter interface keypad 33 while seated at a remote location, such as in a wheelchair. The module includes a clamp assembly 61 which may include pivoting features to permit the module to be mounted to a supporting surface, such as, for example, the arm of a wheelchair. A pair of audio jacks 62 and 63 provide standard one-eighth inch and one-fourth inch connections for headphones and an ADA jack 64 provides for connection to a conventional two-contact “sip and puff” device in the manner of jack 34. A keypad 65 on module 60 provides the same key switch inputs as are provided on keypad 33. In particular, a pair of arrow-shaped UP and DOWN keys 66 and 67 provide for up and down navigation, respectively, on the display screen of display assembly 47 or within a complementary audio menu. A pair of arrow-shaped keys 68 and 69 provide for back (BACK) and forward (NEXT) navigation, respectively, on the display screen of display assembly 47 or in the conforming audio menu. A SELECT key 70 provides for selection of a particular choice on the display screen or the audio menu.

Four additional function keys are provided to assist the voter when using the audio interface. In particular, a diamond-shaped SCREEN blanking key 71 enables the voter to selectively disable, or blank the display screen of display assembly 47 for improved privacy when voting using the audio interface. A round REPEAT key 72 enables the voter to request that a name or phrase provided by the audio interface be selectively repeated. A rocker-type VOLUME switch 73 enables the audio level of the audio interface to be selectively increased or decreased, and a rocker-type TEMPO key 74 enables the voter to selectively increase or decrease the rate at which synthesized audio is provided by the audio interface. Both of these functions return to nominal settings upon the insertion of a ballot so that each subsequent user can make his or her own adjustment from a fixed nominal setting. Module 60 is preferably connected to terminal 30 by a flexible cable 75, although it is contemplated a wireless RF or JR link could be used instead.

Figure 4A:
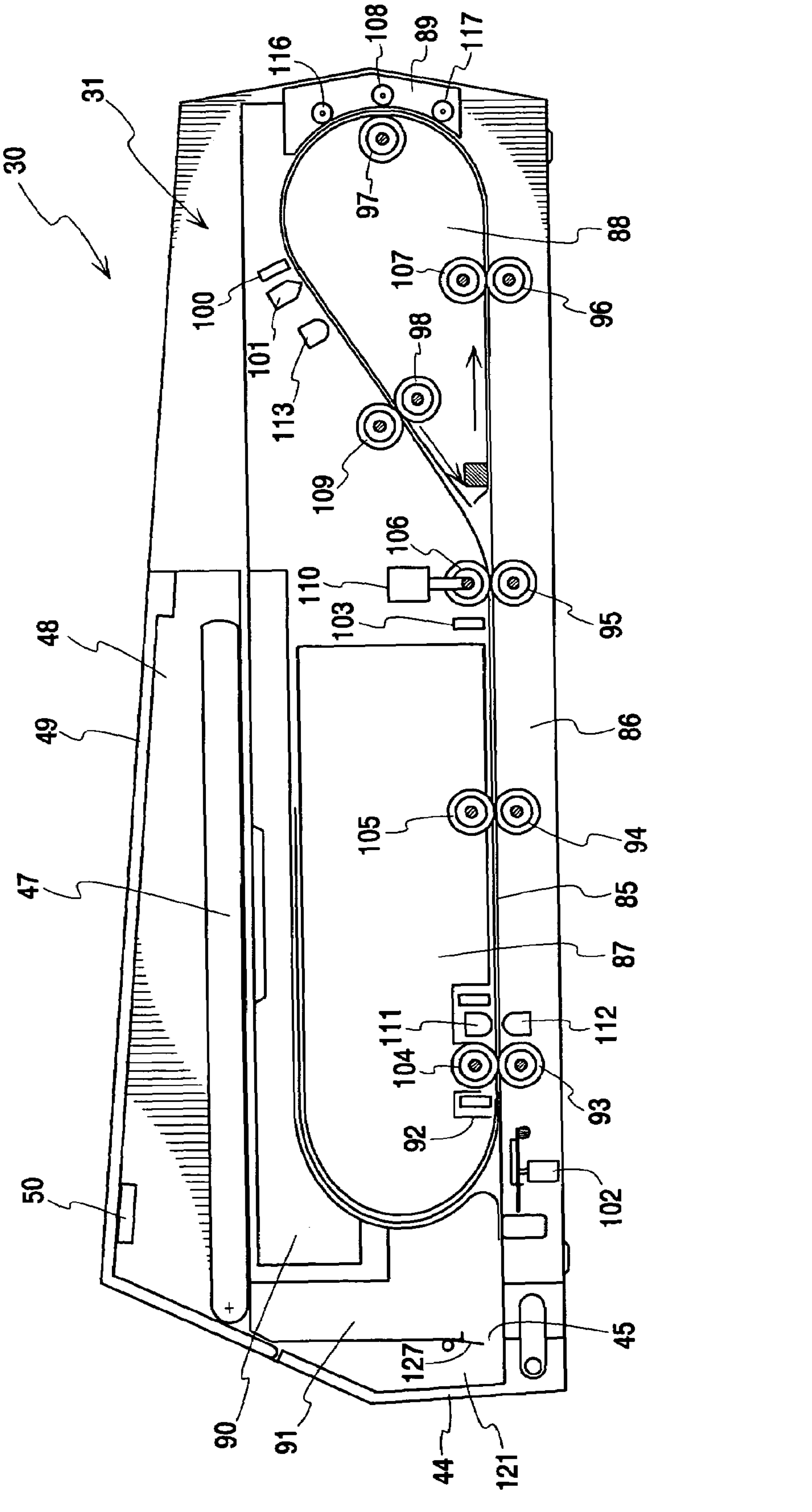
FIG. 4*a* is a simplified cross-sectional view of the ballot marking terminal of FIGS. 1 and 2 showing the terminal in its closed storage or transit condition.

An identical set of voter interface key switches is provided on interface panel 33. In particular, as better shown in FIG. 9, interface panel 33 includes arrow-shaped UP and DOWN navigation keys 76 and 77, arrow-shaped BACK and FORWARD navigation keys 78 and 79, respectively, and a square-shaped, centrally located SELECT key 80. These keys have the same functions in the audio interface protocol as the previously described navigation keys 66–70 of interface module 60. In addition, voter interface panel 33 includes a diamond-shaped SCREEN display blanking key 81, a round REPEAT key 82, and rocker-type VOLUME and TEMPO keys 83 and 84, respectively. The relationship between display assembly 47, ballot tray 44 and housing 31 is shown in FIGS. 4*a*–4*d*. In FIG. 4*a*, ballot marking terminal 30 shown in a closed or transit state with ballot tray 44 and cover 49 in their closed positions. Display assembly 47 is protected within recess 48 by cover 49.

Also shown in FIG. 4*a* is the paper path through which ballot 43 is conveyed when inserted into ballot marking terminal 30. This paper path, which is generally designated 85, is formed by a bottom tray assembly 86 and a removable top tray member 87, a ballot reversing guide assembly 88, a removable rear-mounted guide assembly 89, and a second removable guide member 90 at the bottom of recess 48, and a fixed guide member 91 forming part of housing 31. When a ballot is introduced through ballot receiving slot 45, the leading edge of the ballot is sensed by a conventional photo detector 92. This causes a first set of three paper handling rollers 93, 94 and 95, which are coupled by a belt to a single drive motor (not shown), to advance the ballot along paper path 85 between tray assembly 86 and guide member 87. Eventually, ballot 43 continues past roller 95 and is engaged by a second set of three ballot drive rollers 96, 97 and 98, which are coupled by a belt to a single drive motor (not shown), which continue to feed the ballot until the leading edge of the ballot is sensed by a second photo detector 100. At this point, movement of the ballot is stopped and the ballot is positioned just short of a print head 101 provided within ballot marking terminal 30 for the purpose of marking voter selections and entering the names of write-in candidates. For improved alignment of the leading edge of the ballot at print head 101, drive roller 97 may be alternatively powered by a separate motor in a reverse direction, i.e., in a direction tending to discharge the ballot, for a very brief moment as the leading edge of the ballot engages the roller. This technique provides for a better alignment of the ballot as it reaches print head 101.

When ballot 43 reaches detector 100 ballot feed rollers 93–98 stop, and a series of screens is presented to the viewer on the display screen module 47 or by the audio menu controlled by voter interface key switch panel 33 to enable the voter to make his or her choices of the candidates contained on the ballot. After the selection process is complete, feed rollers 96, 97 and 98 are again powered to advance the ballot past print head 101 so that any necessary marking to the back side of the ballot can be accomplished. At the same time, ballot feed rollers 93–95 are caused to turn in a reverse direction so that, as the ballot again comes back into contact with tray assembly 86, the ballot is conveyed back in the direction of ballot feed slot 45. However, a solenoid operated gate 102 is actuated to divert the ballot upwardly away from the ballot feed slot and around the path defined between guide members 87, 91 and 90. As a result, the ballot does not extend out onto the feed tray but rather is entirely contained within housing 31. After the trailing edge of the ballot has cleared ballot feed roller 95, as sensed by the passage of the trailing edge at a photo detector 103, ballot feed rollers 93–95 are stopped. Next, ballot feed rollers 93–95 and ballot feed rollers 96–98 are caused to rotate in a forward direction so as to again advance the ballot along tray assembly 86 toward print head 101. This continues until the leading edge of the ballot is sensed by sensor 100, at which time the ballot feed rollers 93–98 are stopped and the ballot is in position to have its front side printed by print head 101. Feed rollers 96–98 now advance the ballot past print head 101 to cause the front side to be printed and ballot feed rollers 93–95 are reversed to receive the printed ballot and convey the ballot back to the voter through feed slot 45. Pinch rollers 104–109 are provided in opposition to ballot drive rollers 93–98 at the opposite side of paper path 85 to force a frictional engagement between the drive rollers and the ballot. In the case of long ballots, it is possible that the leading edge of the ballot may overlap the trailing edge of the ballot as the ballot is conveyed by ballot feed rollers 96–98 past print head 101. To allow the leading edge of the ballot to override the trailing edge of the ballot in the case of a long ballot, a solenoid 110 is provided to lift roller 106 out of engagement with roller 95. This prevents roller 95 from having any effect on the overlapping ballot while the overlap exits. As the ballot is discharged following is second pass by print head 101, the solenoid-actuated ballot diverter gate 102 is positioned to allow the ballot to feed out through ballot receiving slot 45.

It will be appreciated that, while two sets of three drive rollers each have been shown in the preferred embodiment, it is possible to use a greater or lesser of number of ballot feed rollers where shorter or longer ballot requirements must be met. Also, while photo detectors 92, 100 and 103 have been utilized to sense ballot position, other types of detectors can be used for this purpose, including mechanical switch detectors. Furthermore, it is possible that ballot position detector 103 can be eliminated by timing the actuation of the ballot drive rollers after the trailing edge of the ballot has cleared ballot position sensor 100.

An additional function performed within the ballot marking terminal 30 is the scanning of both sides of the ballot as the ballot is received. This is accomplished by a pair of scanners 111 and 112 as the ballot proceeds along feed tray 86. As will be described presently, the information derived from scanners 111 and 112 is utilized in the operation of print head 101 to mark selections on the ballot. Also, this information is analyzed to determine whether the ballot has been damaged, what format of ballot has been inserted and whether any marking has already occurred of the ballot. A third scanner 113 positioned along ballot feed path 85 is utilized to determine whether print head 101 has properly marked a ballot. In particular, the data derived by scanner 113 is utilized to determine whether any selection positions on the ballot which should have been marked have been marked, or whether any selection locations that should not have been marked have been marked.

Figure 4B:
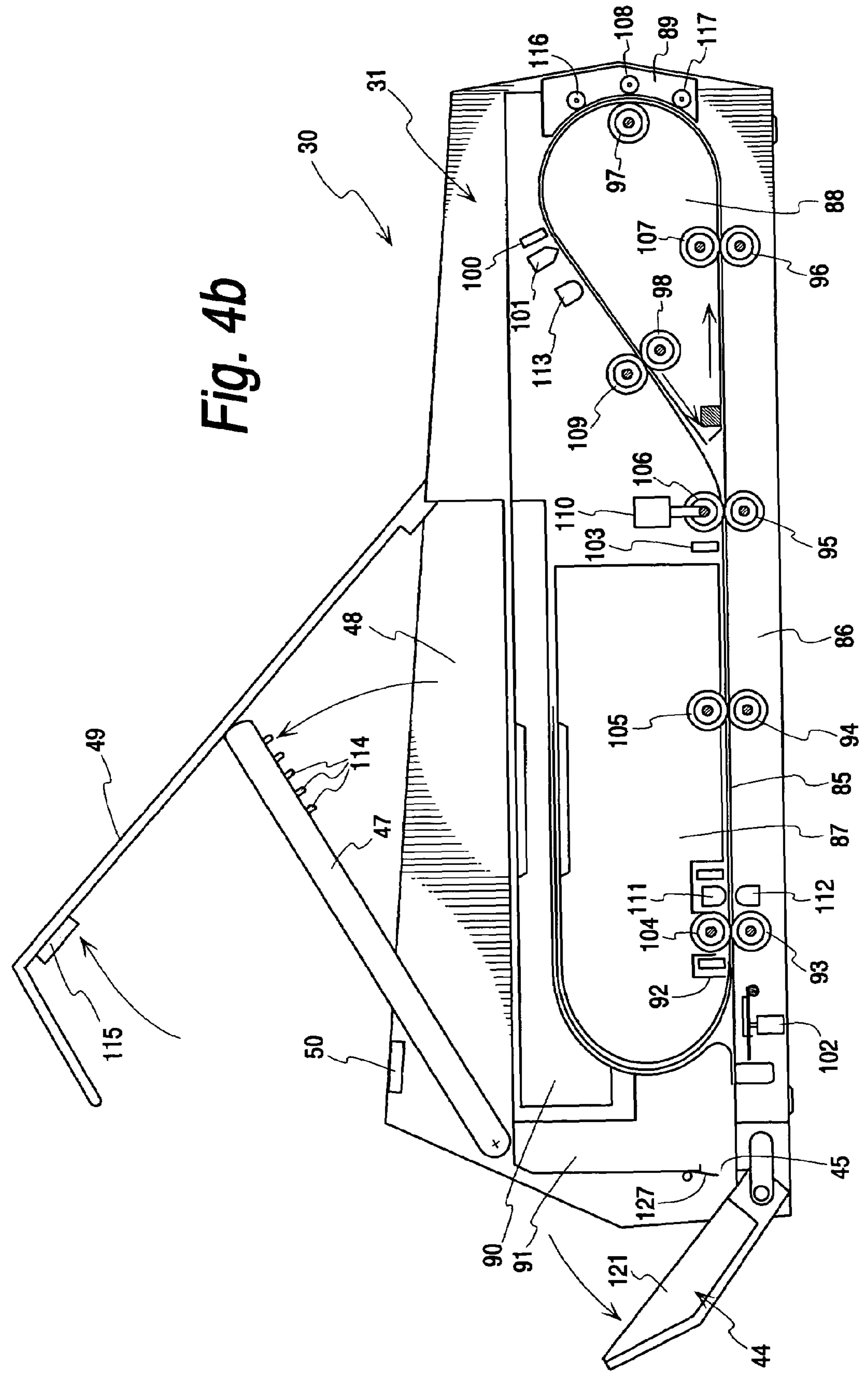
FIG. 4*b* is a simplified cross-sectional view of the ballot marking terminal similar to FIG. 4*a* showing the terminal in the process of being opened for use.
Figure 4C:
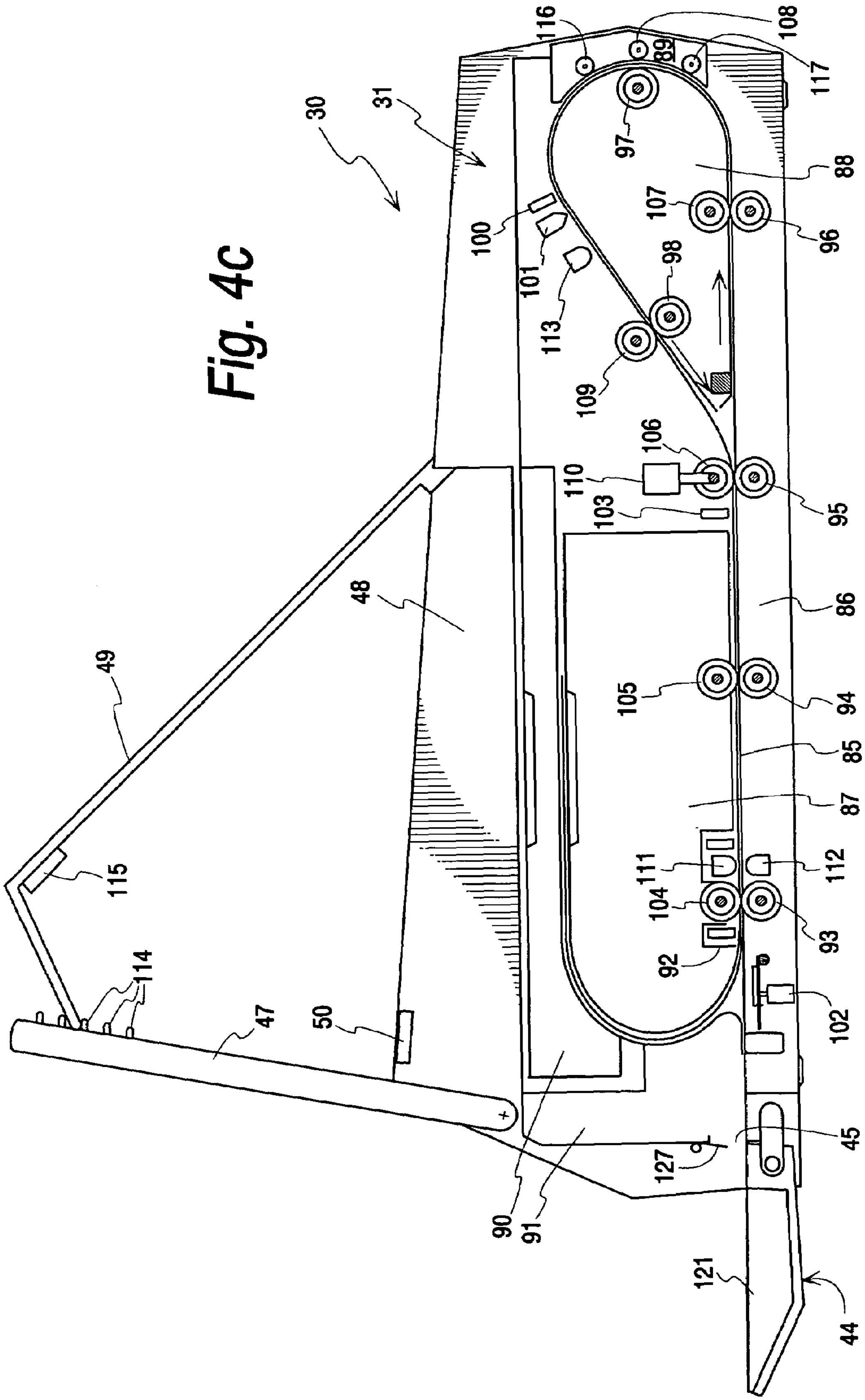
FIG. 4*c* is a simplified cross-sectional view of the ballot marking terminal similar to FIG. 4*a* showing the terminal in an open operating condition.

As shown in FIG. 4*b*, conversion of ballot marking terminal 30 from a storage or transit condition to an operating condition is first accomplished by pivoting cover 49 upwardly away from recess 48 and then pivoting display assembly 47 forward toward the front of the unit. At the same time, feed tray 44 is pivoting downwardly as shown in FIG. 4*c* when display assembly 47 has been pivoted to its viewing position, cover 49 is pivoted forward until the front edge of the cover engages a selected one of a plurality of ridges 114 on the rear surface of the assembly. By selecting which ridges engage cover 49 viewing angle of the display assembly 47 can be varied to suit voter preferences. Cover 49 preferably includes a latch engaging member 115 for engaging the sliding latch 50 when the cover is in its storage position as shown in FIG. 4*a*.

Figure 4D:
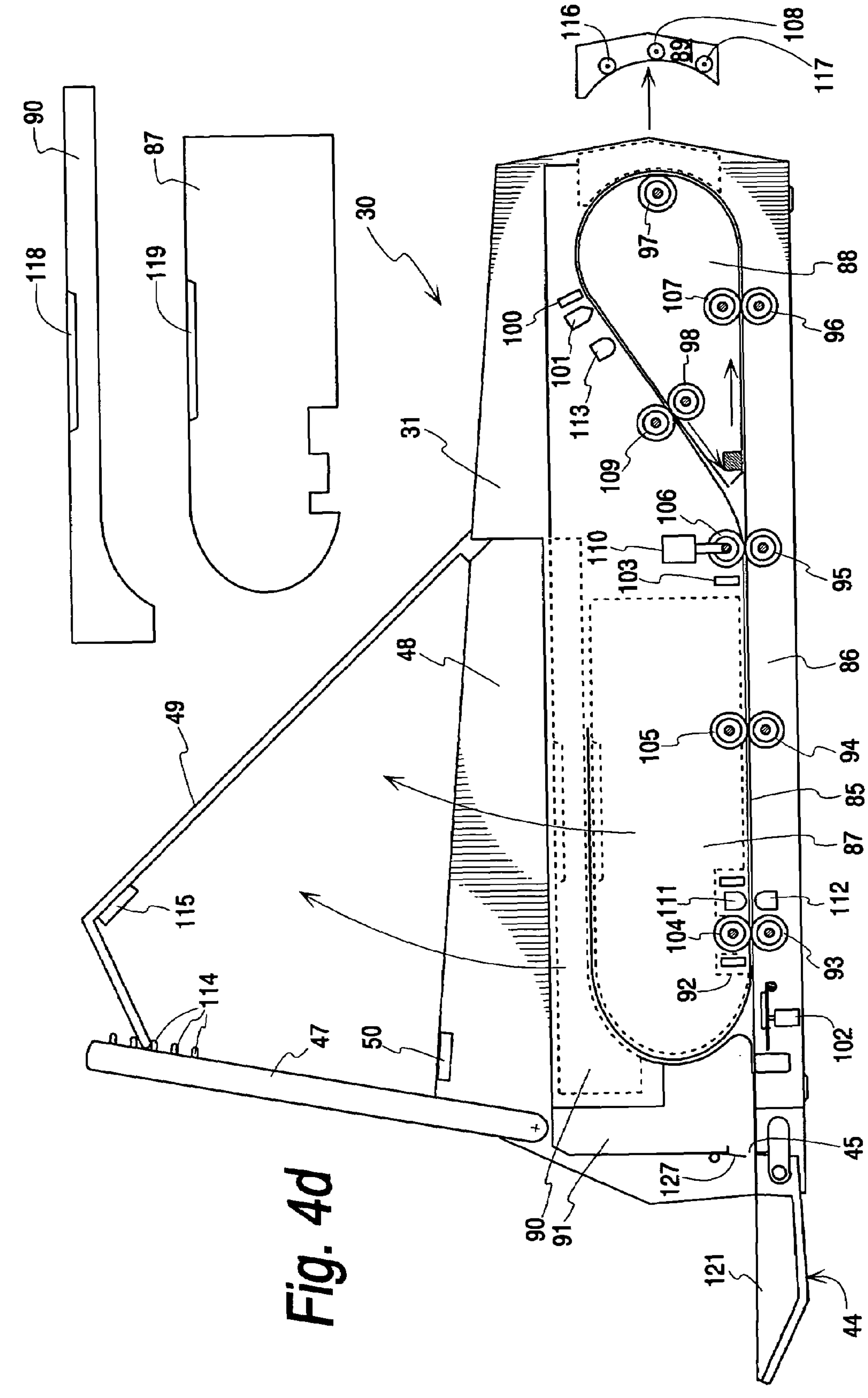
FIG. 4*d* is a simplified cross-sectional view of the ballot marking terminal similar to FIG. 4*c* showing principal paper guide components thereof removed to provide access to the paper path of the terminal.

Referring to FIG. 4*d*, ballot guide assemblies 87, 89 and 90 are preferably constructed as removable components to provide access to paper path 85 in the event a ballot becomes jammed or cleaning of the paper path 85 is necessary. As best seen in FIG. 4D, guide member 89 is removable from the back side of housing 31 and may include a pair of additional rollers 116 and 117 to reduce friction with the ballot as it reverses direction prior to encountering print head 107. It should be noted that ballot guide assemblies 87 and 90 are removable through recess 48, cover 49 first being pivotally positioned toward the rear of housing 31 and then guide member 90 being lifted out through recess 48. A latch assembly (not shown) may be optionally provided to secure ballot guide member 90 in position and a handle 118 may be molded into the guide member to assist in the removal process. Once ballot guide member 90 has been removed, ballot guide member 87 can be similarly removed through recess 48. A handle 119 may be provided on the top surface of guide member 87 to assist in the removal. As with guide member 90, a latch assembly may be provided to hold ballot guide member 87 in position within housing 31. Ballot feed tray assembly 86 and ballot guide members 87, 88, 89, 90 and 91 may be advantageously molded of a high-strength, durable plastic material. Preferably, the surfaces of these members which engage the ballot may be provided with a plurality of parallel-spaced ribs to minimize contact with the face of the ballot and thereby minimize friction between the ballot and the housing and the ballot advances along paper path 85.

Figure 5:
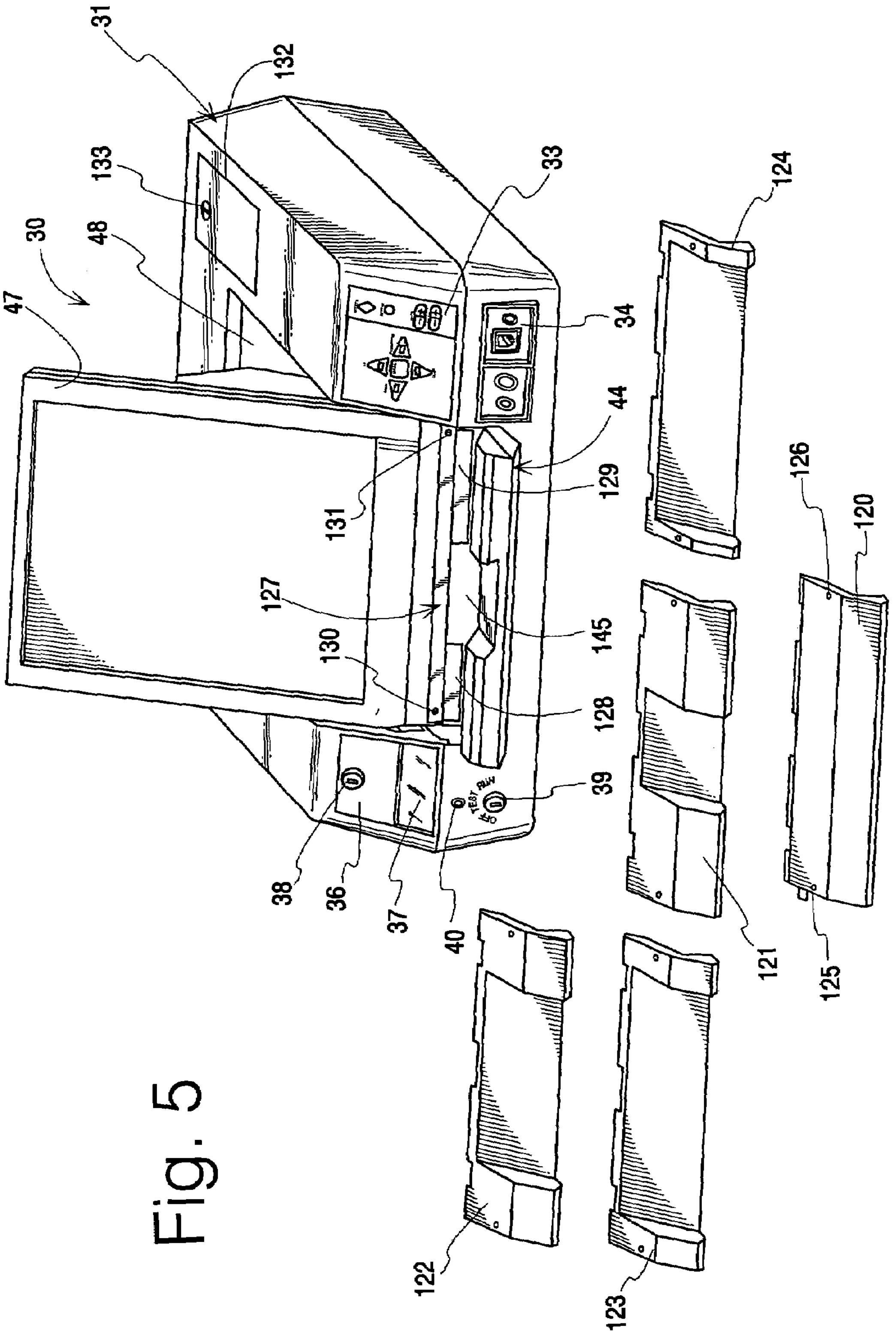
FIG. 5 is a perspective view of the ballot marking terminal of FIGS. 1 and 2 showing various alternative ballot feed trays provided for use with the terminal to accommodate ballots of various widths.

Referring now to FIG. 5, to enable ballot marking terminal 30 to accommodate different widths of pre-printed ballots, ballot tray assembly 44 is preferably constructed to accommodate feed tray members of various widths. In particular, as shown in FIG. 5, ballot feed tray 44 preferably consists of a base member 120 on which tray surface members 121–124 of progressive increasing widths are mounted. To secure the tray surfaces in position, while allowing for convenient changes in ballot widths, the tray surfaces are each preferably secured to the tray base 120 by means of a pair of machine screws which extend through apertures and engage the tray member by means of threaded bores 125 and 126. As can be seen in FIG. 5, each of the feed tray members 121–124 define ballot feed paths of appropriate widths to encourage the ballot to be correctly fed through ballot feed slot 45. As a further deterrent to the ballot from being fed in in misalignment a shutter assembly 127 comprising a pair of spring-biased shutters may be provided to mask ballot feed slot 45 on either side of the desired ballot feed channel. In particular, this assembly 127 may have first and second shutters 128 and 129 disposed on either side of the ballot feed channel and constrained to freely swing outwardly but not inwardly, so that a ballot being discharged that is not perfectly aligned with the feed channel is freely discharged onto a feed tray, while a voter attempting to feed the ballot in misalignment with the feed slot is prevented from doing so by the shutters. The shutter assembly 127 may be mounted to the front of housing 31 by means of a pair of machine screws 130 and 131 so that the shutter assembly 127 can be readily changed to accommodate different ballot widths.

Figure 6:
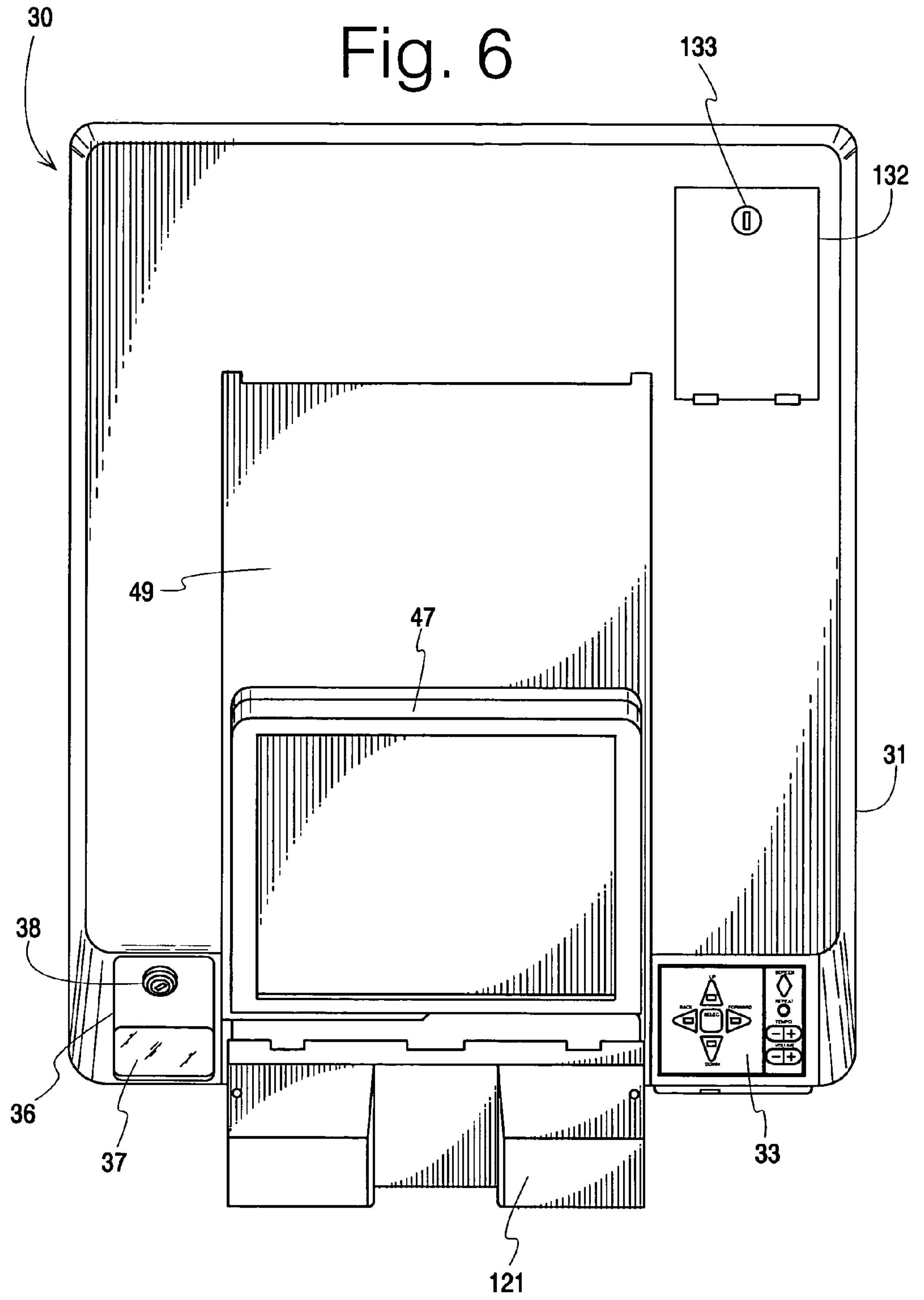
FIG. 6 is a top view of the ballot marking terminal of FIGS. 1 and 2 showing principal exterior housing features thereof.

Referring to FIG. 6, ballot marking terminal 30 may include a combination battery access and print head access door 132. A key lock assembly 133 may be provided to prevent unauthorized access to either the print head or the battery.

Figure 7:
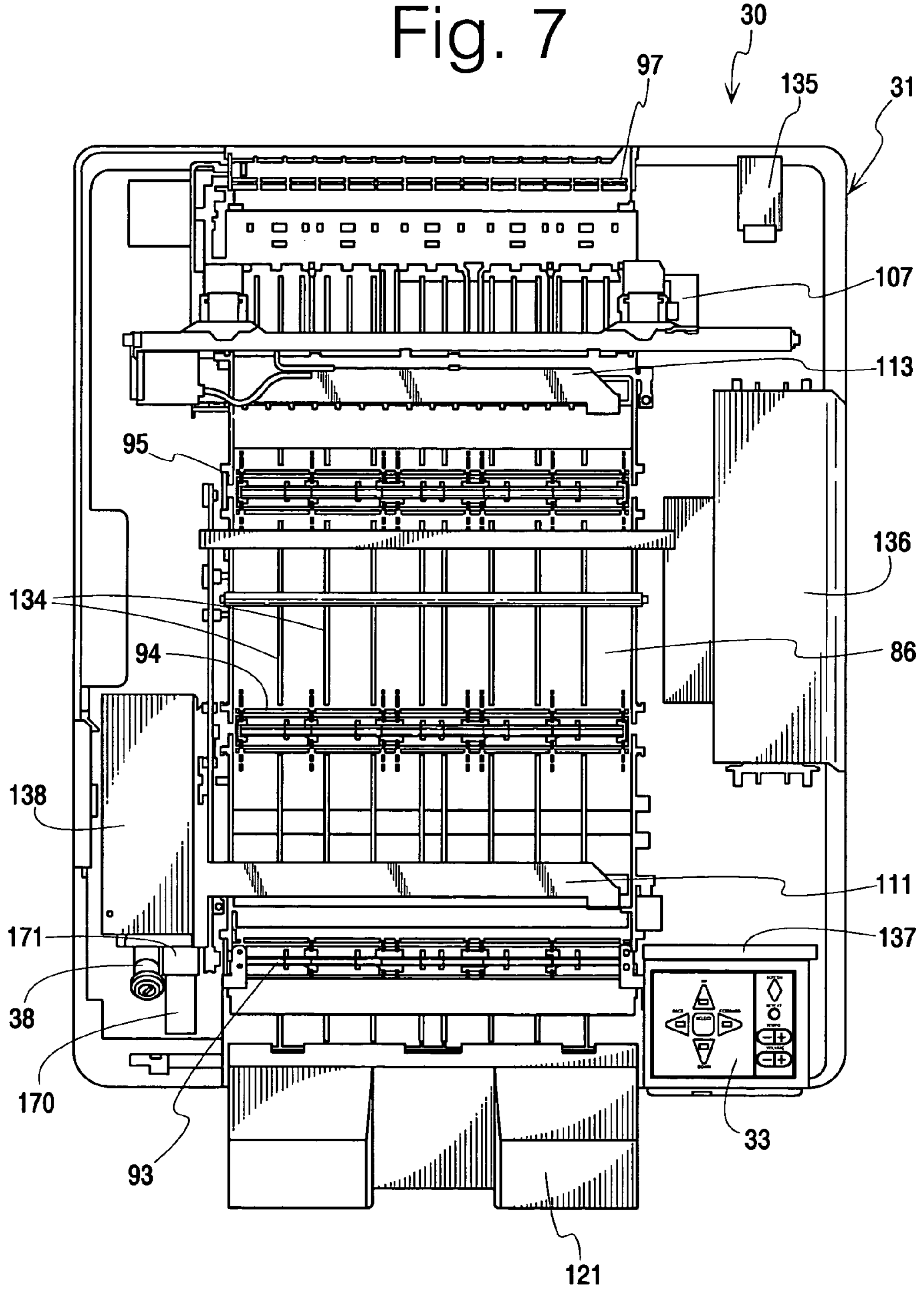
FIG. 7 is a top perspective view of the ballot marking terminal with the top section of the housing removed to show the principal interior components of the terminal.

Paper path 85 and certain principal components of ballot marking terminal 30 are shown in FIG. 7, which depicts the terminal with the top section of the housing and ballot guide members 87, 89 and 90 removed. A plurality of parallel-spaced ribs are shown to be provided on the ballot engaging surface of tray assembly 86 to minimize function with the ballot. The need for guide rails is avoided by the use of ballot feed trays appropriate to the ballot width. Additional components seen FIG. 7 include a receptacle 135 for receiving AC power, a power supply module 136, a key switch interface module 137 and a processor assembly 138.

Figure 8A:
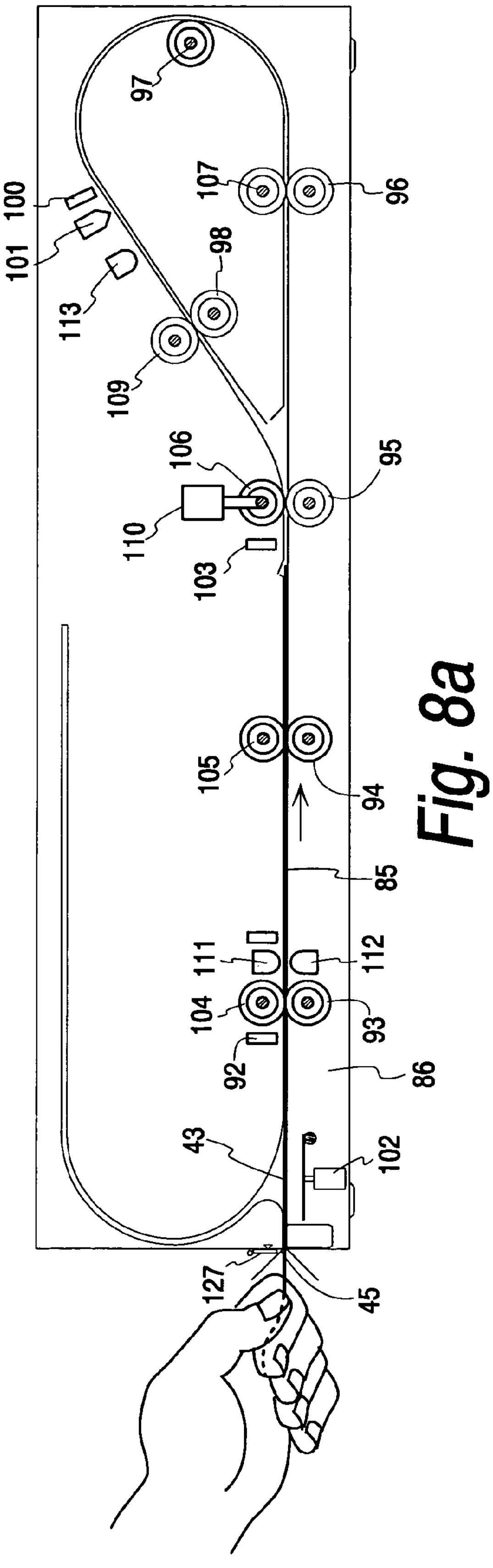
FIG. 8*a* is a simplified cross-sectional view of the paper path of the ballot marking terminal of FIGS. 1 and 2 showing the receipt of a ballot by the terminal.
Figure 8B:
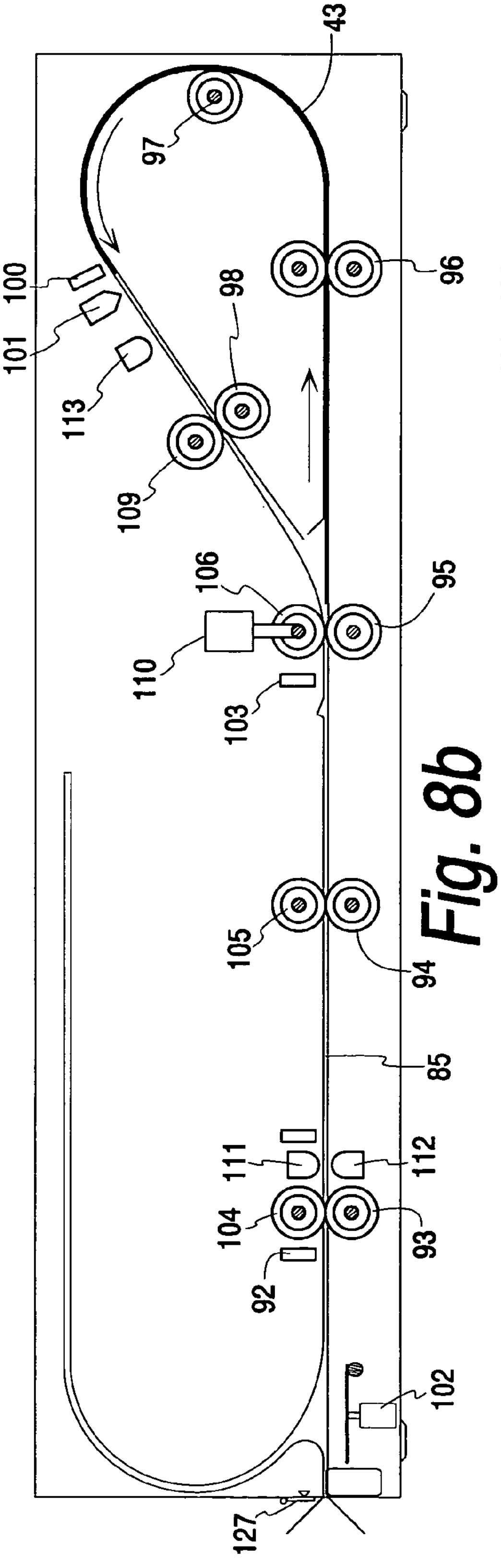
FIG. 8*b* is a simplified cross-sectional view of the paper path similar to FIG. 8*a* showing the ballot having progressed in the terminal to a location just prior to printing.
Figure 8C:
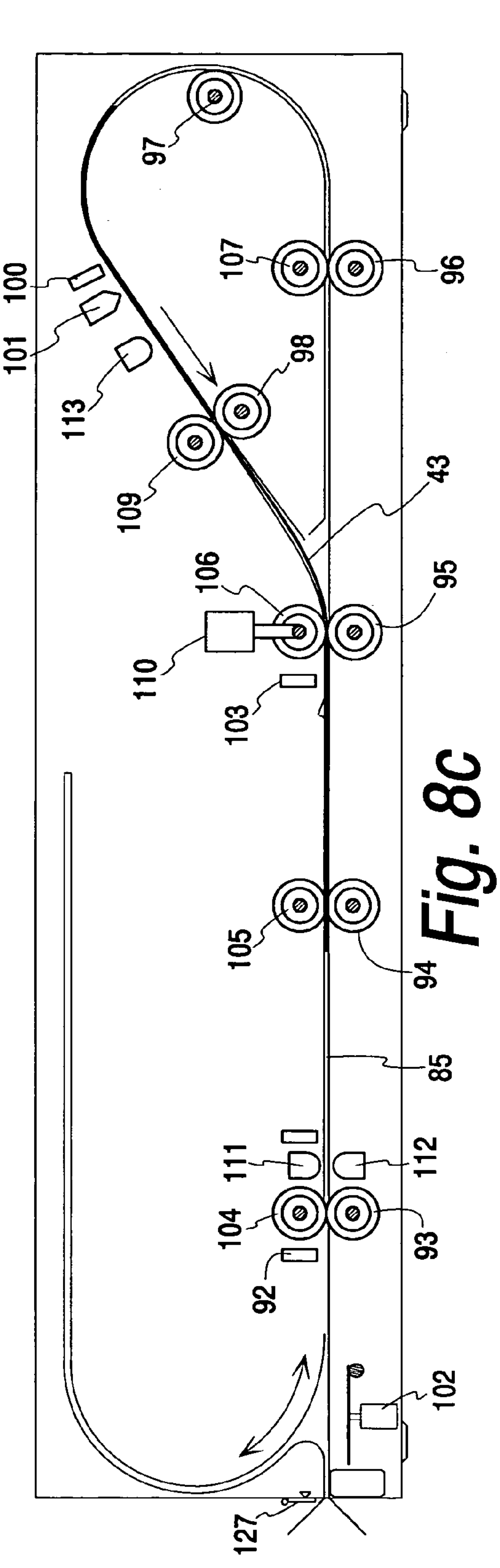
FIG. 8*c* is a simplified cross-sectional view of the paper path similar to FIG. 8*a* showing the ballot being presented on its back side as it passes the print head.
Figure 8D:
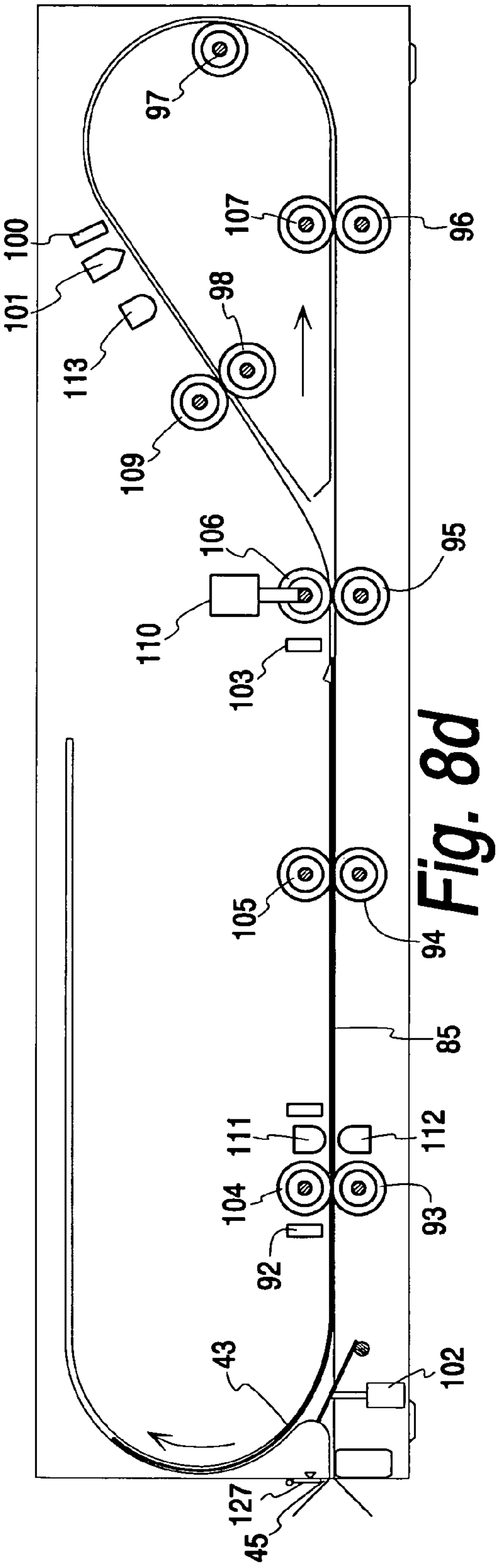
FIG. 8*d* is a simplified cross-sectional view of the paper path similar to FIG. 8*a* showing the ballot at rest, having cleared the reversing loop of the paper path prior to being moved in the reverse direction.
Figure 8E:
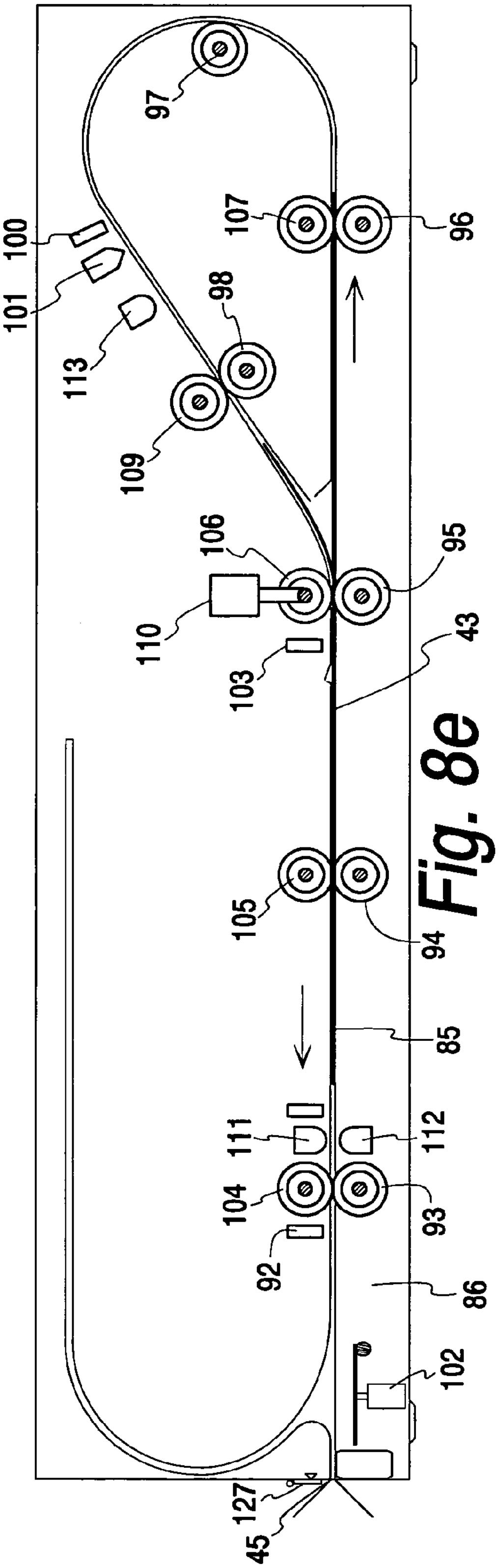
FIG. 8*e* is a simplified cross-sectional view of the paper path similar to FIG. 8*a* showing the ballot advancing along the reversing loop of the paper path prior to being printed on its front side.
Figure 8F:
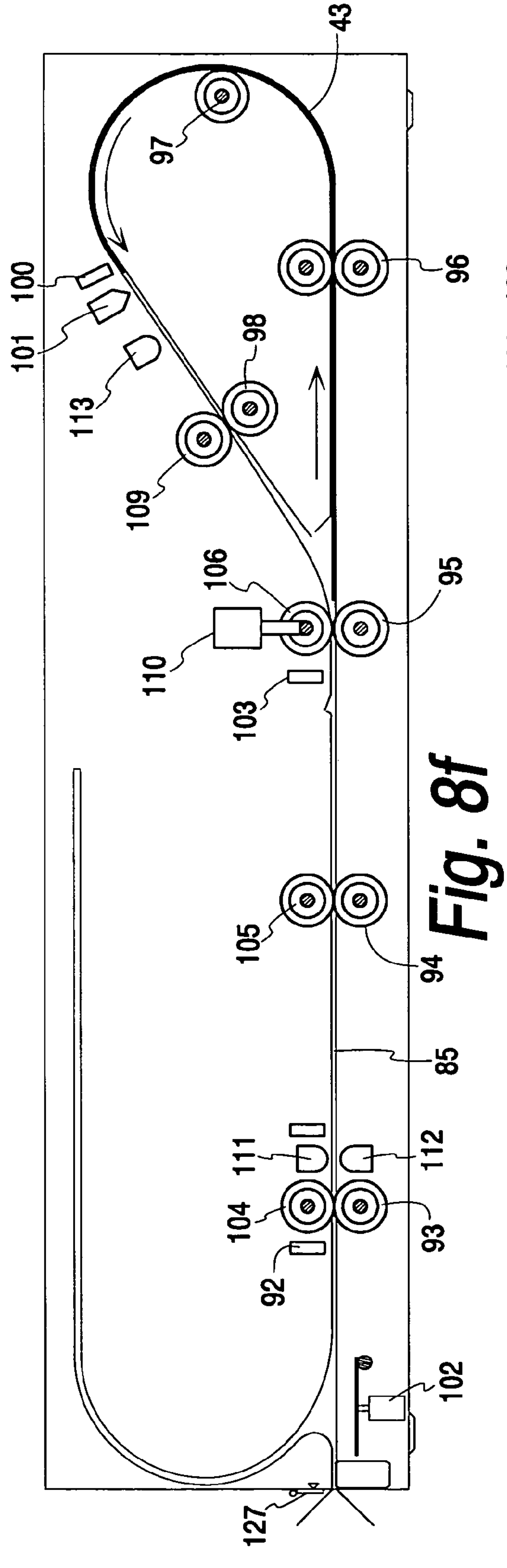
FIG. 8*f* is a simplified cross-sectional view of the paper path similar to FIG. 8*a* showing the ballot having stopped just prior to the print head.
Figure 8G:
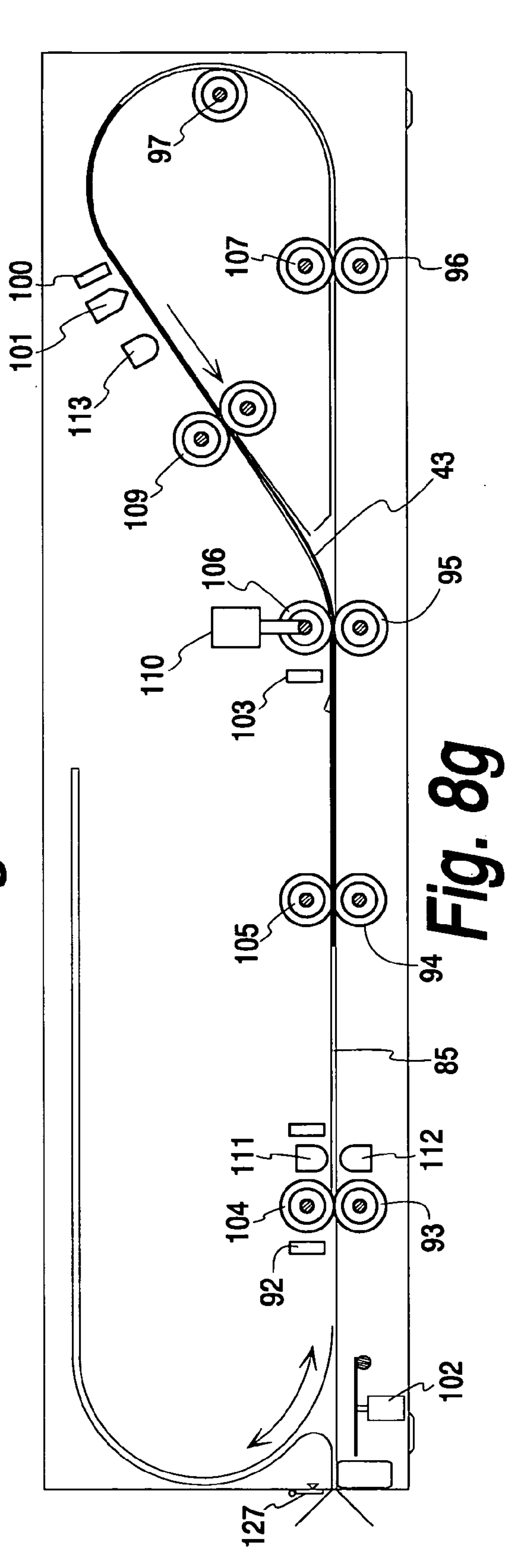
FIG. 8*g* is a simplified cross-sectional view of the paper path similar to FIG. 8*a* showing the ballot being printed on its front side as it passes the print head.
Figure 8H:
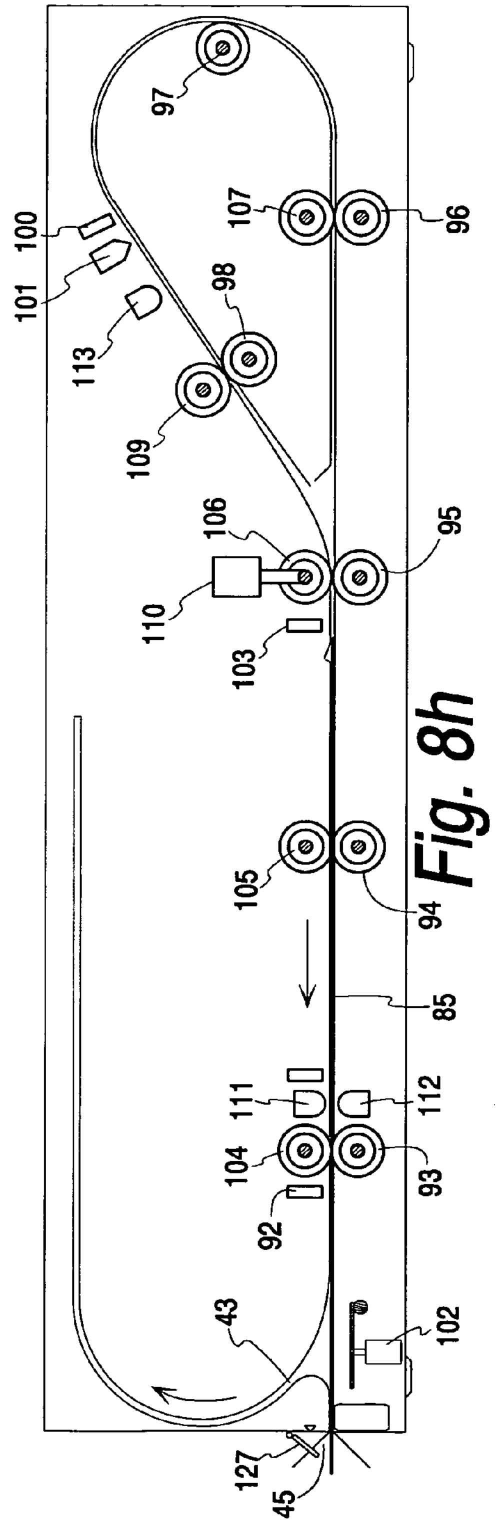
FIG. 8*h* is a simplified cross-sectional view of the paper path similar to FIG. 8*a* showing the ballot being discharged from the terminal.

The handling of ballot 43 within ballot marking terminal 30 is illustrated in FIGS. 8*a*–8*e*. Referring to FIG. 8*a*, upon initial insertion of ballot 43, detector 92 senses the leading edge of the ballot and ballot feed rollers 93–95 and 96–98 are caused to rotate, feeding the ballot as shown from ballot feed slot 45. The ballot continues to advance until the leading edge of the ballot is sensed by sensor 100, at which time ballot feed rollers 93–95 and 96–98 are stopped, positioning the ballot at shown in FIG. 8*b*. The voter is now presented with a series of screens on the LCD touch screen assembly 47 to provide the voter with the opportunity to make a selection in each contest contained on the ballot. At this time, both the top and bottom surfaces of the ballot have been scanned by scanners 111 and 112 to form a bitmap within the terminal processor, and, in a manner to be described, the bitmap is processed to determine the I.D. of the ballot and the exact location of each marking location contained on the ballot. To this end, reference is made to data stored on a compact flash card previously inserted into the terminal to provide the terminal with format, or style, information for each ballot I.D. number to be processed by the terminal. Taking this information into use, print head 101 is caused to print appropriate marks on the back side of the ballot as the ballot is advanced past the print head in FIG. 8*c*. The ballot continues to move in the reverse direction along paper path 85 until its trailing edge clears sensor 103, at which time the ballot stops as shown in FIG. 8*d*. It should be noted that the solenoid-actuated ballot diverter gate 102 has been actuated so that ballot 43 does not protrude through ballot feed slot 45 and therefore becomes accessible to the voter. Ballot 43 is next advanced toward print head 101 as shown in FIG. 8*e* until reaching the position shown in FIG. 8*f* Print head 101 next prints the top side of the ballot as the ballot continues past the print head as shown in FIG. 8*g*. At this time, the solenoid-actuated ballot diverter gate 102 is not actuated, and the ballot is caused to be discharged through ballot receiving slot 45. The voter can then take ballot 43, marked on both sides in accordance with his selections, to a scanner or ballot box (not shown) for deposit and subsequent tabulation. It should be noted that the shutter assembly 127 at ballot feed slot 45 pivots outwardly as necessary to allow the ballot to pass in the event the ballot is not precisely aligned with the installed ballot feed tray.

Figure 8I:
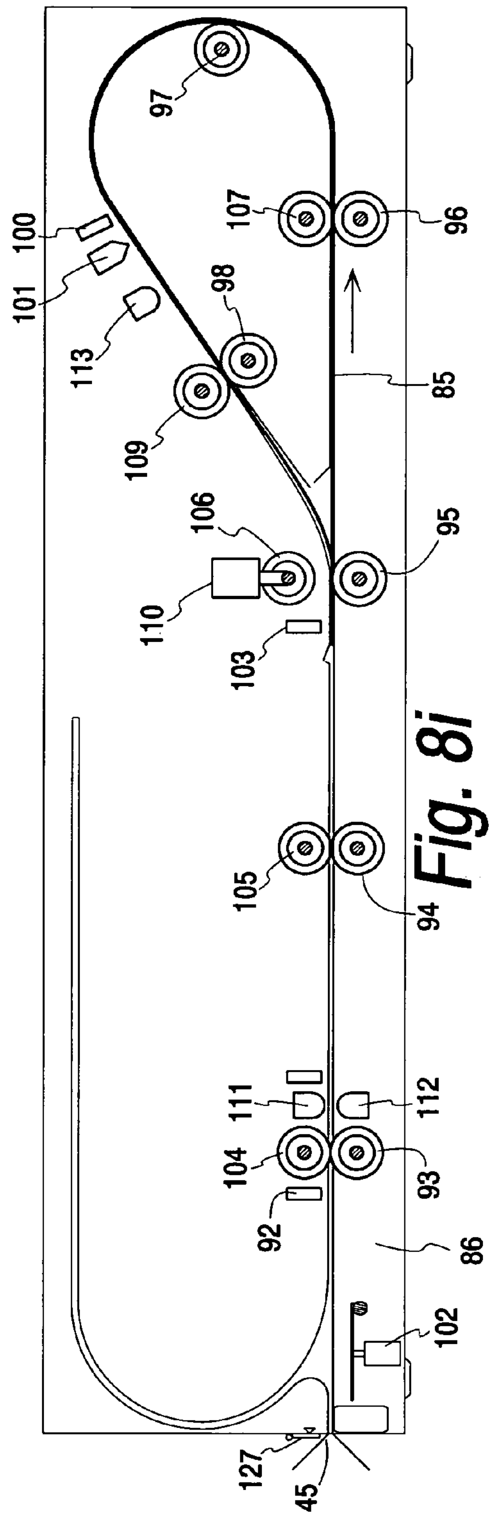
FIG. 8*i* is a simplified cross-sectional view of the paper path similar to FIG. 8*a* showing the ballot wherein the length of the ballot exceeds the length of the paper path along the ballot reversing loop and a pressure roller is raised to allow the leading edge of the ballot to overlap the trailing edge of the ballot.

In the event of a ballot being processed that has a length greater than the length of the reversal loop in paper path 85, solenoid 110 is actuated to lift pressure roller 106 clear of the paper path, as shown in FIG. 8*i*. As a consequence, the leading edge of the ballot can freely pass over the trailing edge, and ballot feed roller 95, although operating, has no effect on the progress of the ballot. This feature allows the ballot reversal loop to be shorter than would otherwise be necessary to handle a long ballot, thereby reducing the necessary depth of housing 31.

Figure 9:
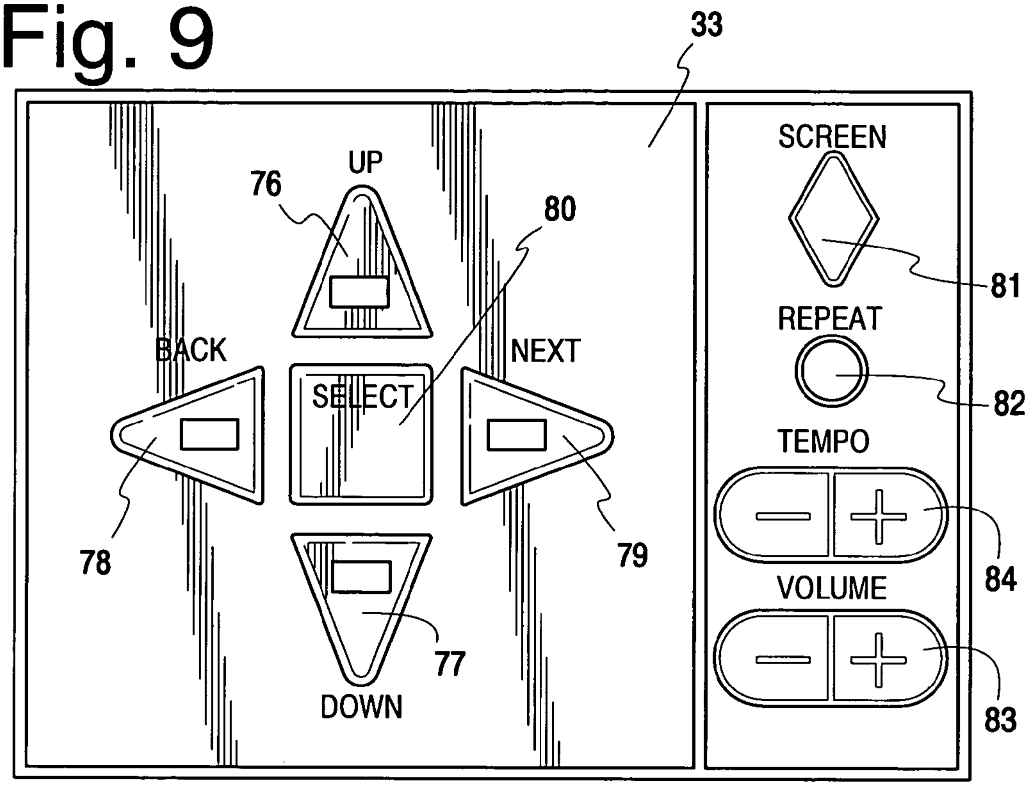
FIG. 9 is an enlarged front elevational view of the user interface keyboard of the ballot marking terminal.

Referring to FIG. 9, the user interface key switch panel 33 is advantageously formed from a seamless flexible plastic membrane for easy maintenance and cleaning. Keys are preferably recessed and are of a positive-action such that the user is provided tactile feedback that his actuation of a switch has occurred. Furthermore, raised rims are preferably provided around each key to make the shapes more easily discerned by touch. The entire switch assembly is preferably removable from housing 31 so that alternative keyboard arrangements can be readily provided if desired.

Figure 10:
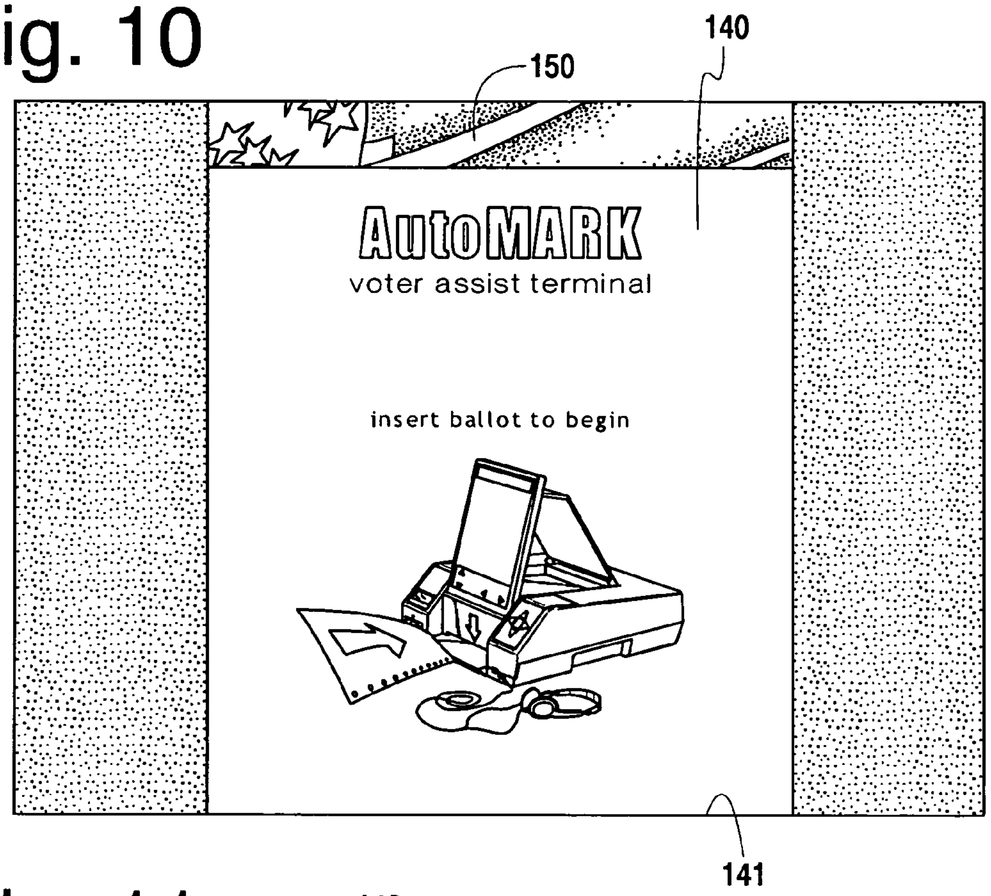
FIG. 10 is a depiction of a typical initial display screen presented to the user prior to insertion of a ballot into the ballot marking terminal for marking.

Referring to FIG. 10, upon initial power-up of ballot marking terminal 30, an introductory screen is preferably displayed on the LCD screen 141 provided by display assembly 47. This introductory display may be customized in accordance with the requirements of the election jurisdiction utilizing the ballot marking terminal. In the present embodiment, the screen is configured to prompt the voter to insert his unmarked pre-printed ballot into the terminal.

Figure 12:
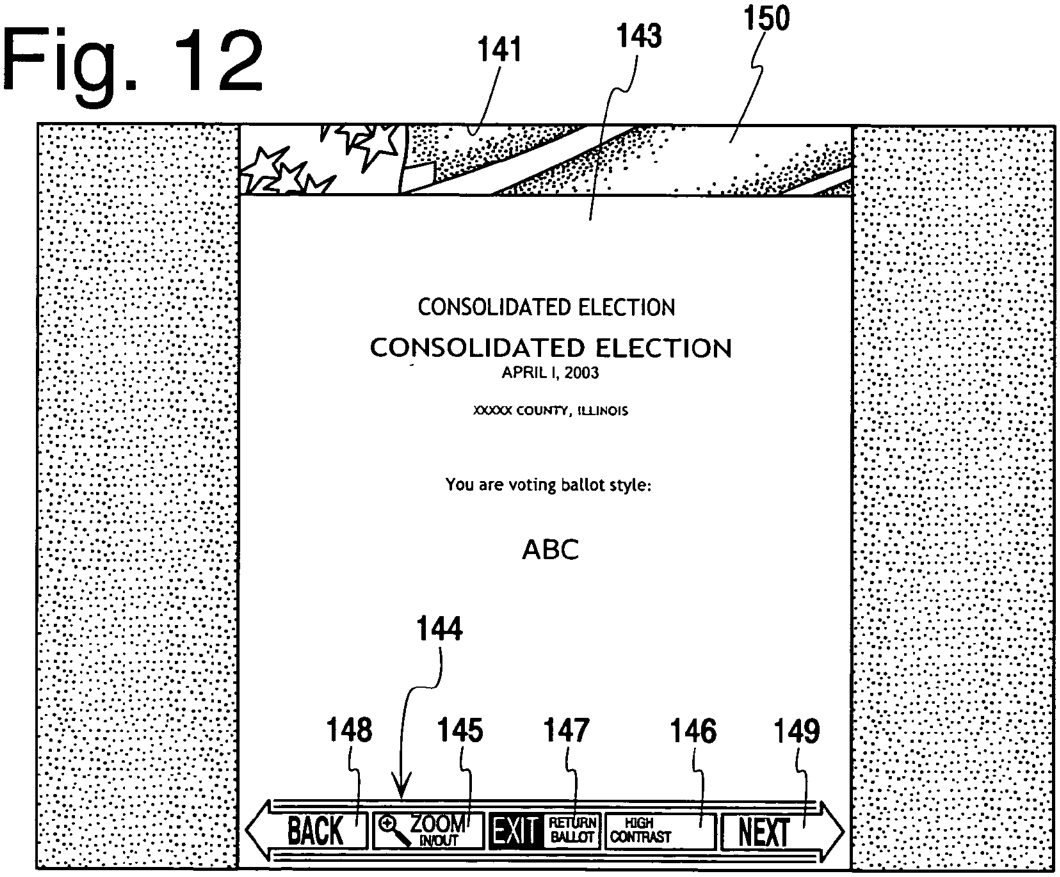
FIG. 12 is a depiction of a display screen which appears after display screen of FIG. 11 showing the details of the election.
Figure 11:
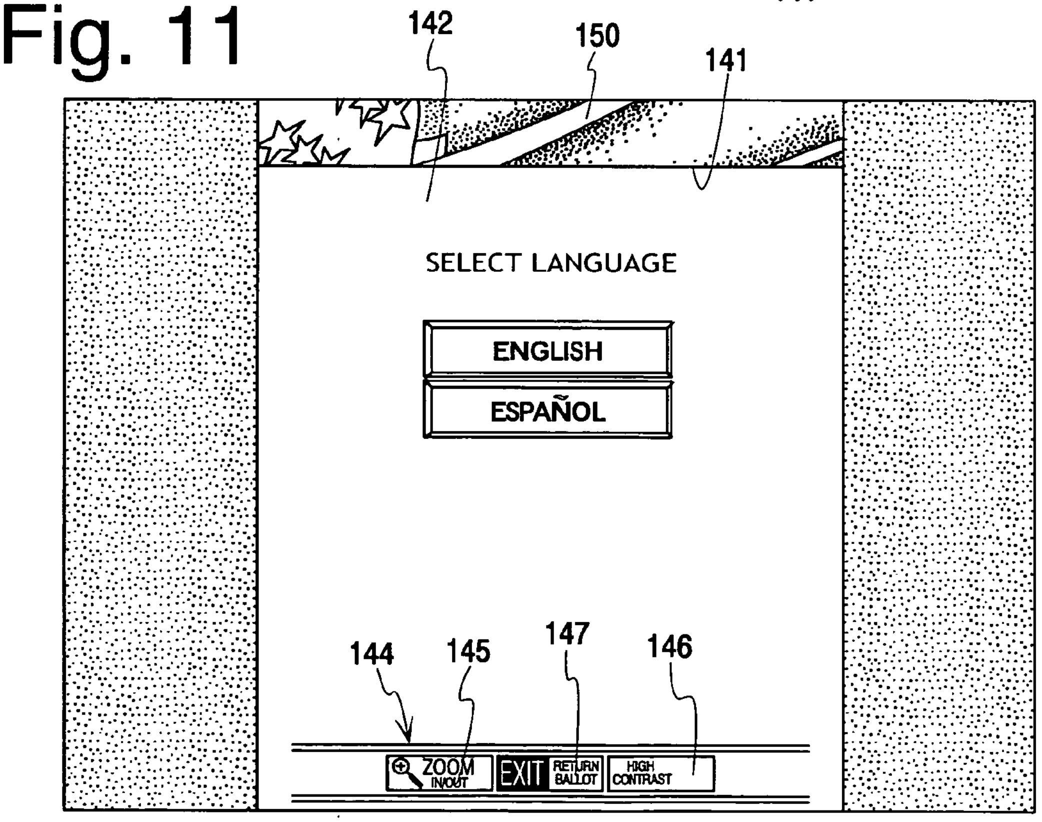
FIG. 11 is a depiction of a subsequent display screen presented to the user to enable the user to select a language in which subsequent prompts are to be presented.

Once a ballot has been inserted, the voter is next prompted by a screen 142 shown in FIG. 11 to select a language in which he desires to receive assistance in marking his ballot. In the present instance, two languages, English and Spanish, are provided for selection. After a language is selected by touching the appropriate portion of touch screen 141, the next screen 143, shown in FIG. 12, is displayed. It should be noted that screen 142, like many subsequent screens, provides a function bar 144 a means by which a voter can perform certain functions. In particular, a zoom function is provided at 145 by which the display is increased in size. The first actuation of the zoom icon enlarges the display and a second actuation returns the display to its normal size. Another function provided on function bar 144 is a high contrast function 146 which causes the color display on the LCD screen to change to a monochrome high contrast display for those voters having difficulty reading the screen because of an inability to discern colors. Also provided on function bar 144 is an exit function 147 which causes the selection process to be terminated and the unmarked ballot to be return to the voter through feed slot 45. In practice, this function may be provided with a pop-up screen forcing the voter to confirm his decision to terminate the selection process prior to the selection process actually terminated and the ballot being returned.

Referring to FIG. 12, ballot marking terminal 30 provides with screen 143 a confirmation to the voter, in the language previously selected, as to which ballot he or she is making selections for, together with any necessary voting instructions. In this case, the ballot style is indicated as ABC, and the election is identified as the Consolidated Election for Apr. 1, 2003. It should be noted with this screen that the function bar has been expanded to include a BACK designation 148 and a NEXT designation 149. The BACK designation 148 enables the voter to return to the previously displayed screen 142, perhaps to make a different language selection. The NEXT designation 149 enables the viewer to proceed to the next screen after reading the message conveyed by screen by 143. It is anticipated that the NEXT designation will blink after a short time delay to prompt the voter to touch that portion of the function bar 144 to proceed to the next screen and continue his or her candidate selections. The banner strip 150 at the top of screen 143 and subsequent screens remains constant during the election process and may be utilized by the election jurisdiction to present a seal or other identification of the jurisdiction to the voter.

Figure 13A:
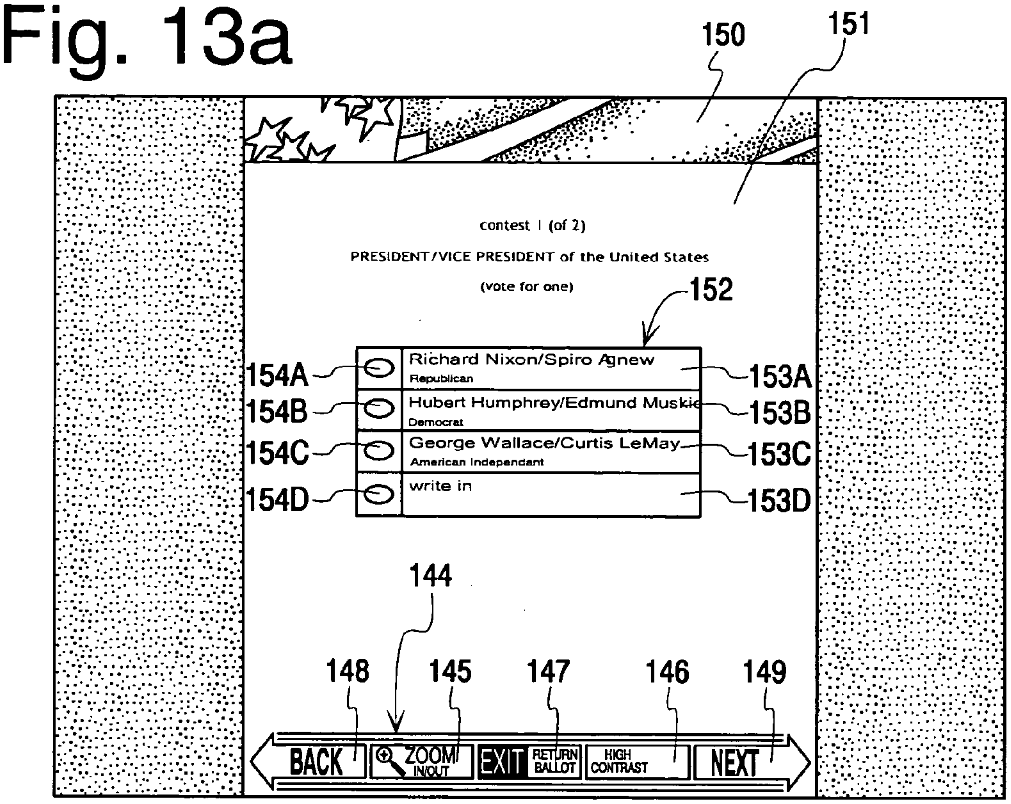
FIG. 13*a* is a depiction of a subsequent display screen showing a contest wherein a single candidate is to be selected.
Figure 13B:
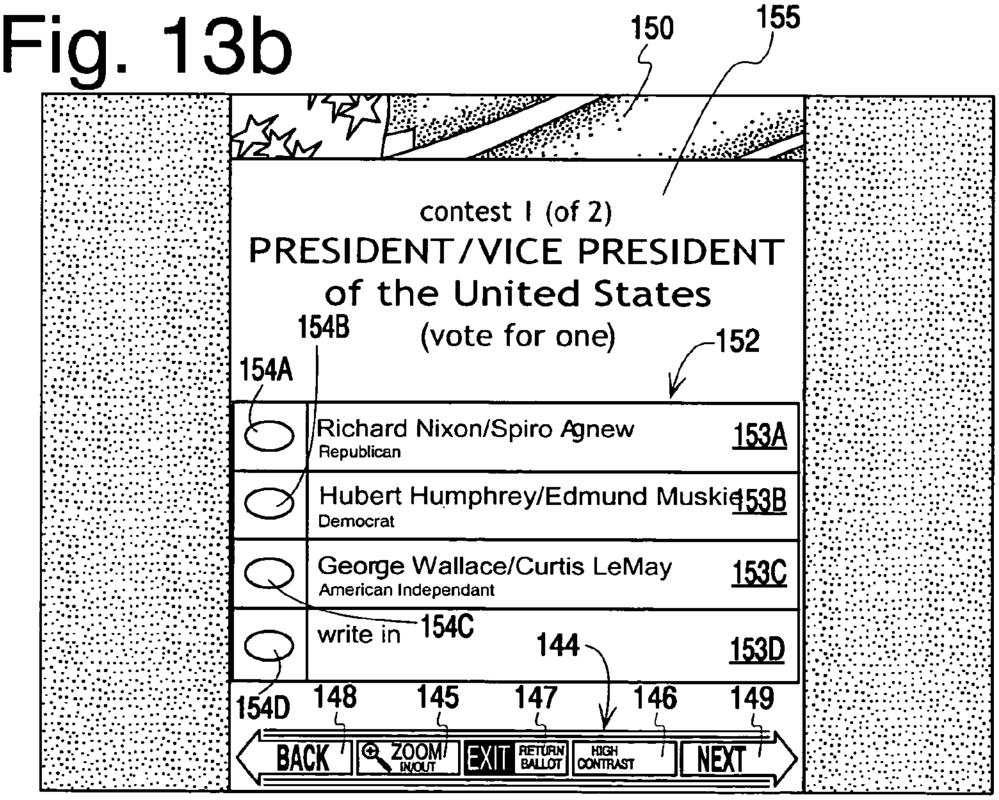
FIG. 13*b* is a depiction of the display screen of FIG. 13*a* following actuation of the zoom function.

Referring now to FIGS. 13*a* and 13*b*, which show screens which might be displayed for an election contest having three named candidates and a single write-in candidate, wherein the voter is allowed to vote for a single candidate. As shown in screen 151, the four possible selections are contained within a box 152, each candidate being within a section 153 of the box and having an associated oval 154 which is darkened or filled in to indicate selection of the candidate. Selections are made on touch screen 141 by touching the section 153 or oral 154 associated with the selected candidate or write-in, which causes that particular section 153 to change color and the associated oval to be changed to black. For example, upon touching the section 153A associated with Richard Nixon/Spiro Agnew, that section turns from white to yellow, and the associated oval 154A changes from white to black. Should another section be subsequently touched, as in making a different selection, it is contemplated that the previously selected candidate will be automatically deselected, the section changing from yellow back to white and the oval changing back to white, and the next selected candidate section 153 changing to yellow and the oval associated with that selected candidate turning to black. In this way the voter can quickly make or change a selection from a particular contest. It is contemplated that only one contest will be provided per display screen. Where a larger number of candidates exist for a particular contest than can be accommodated on a single display screen, then a SCROLL function will be provided consisting of UP or DOWN arrows on either side of box 152 to prompt the voter that additional candidates are available for that contest. In some jurisdictions it may be necessary that a voter scroll through the entire list before having access to the next function 149.

FIG. 13*b* illustrates the ZOOM function. Upon touching the ZOOM icon 145, screen 151 changes to screen 155, making the selection of a candidate easier for a voter having a sight impairment. To return from screen 155 to screen 151, it is only necessary for the voter to touch the ZOOM icon 145 again.

Figure 14:
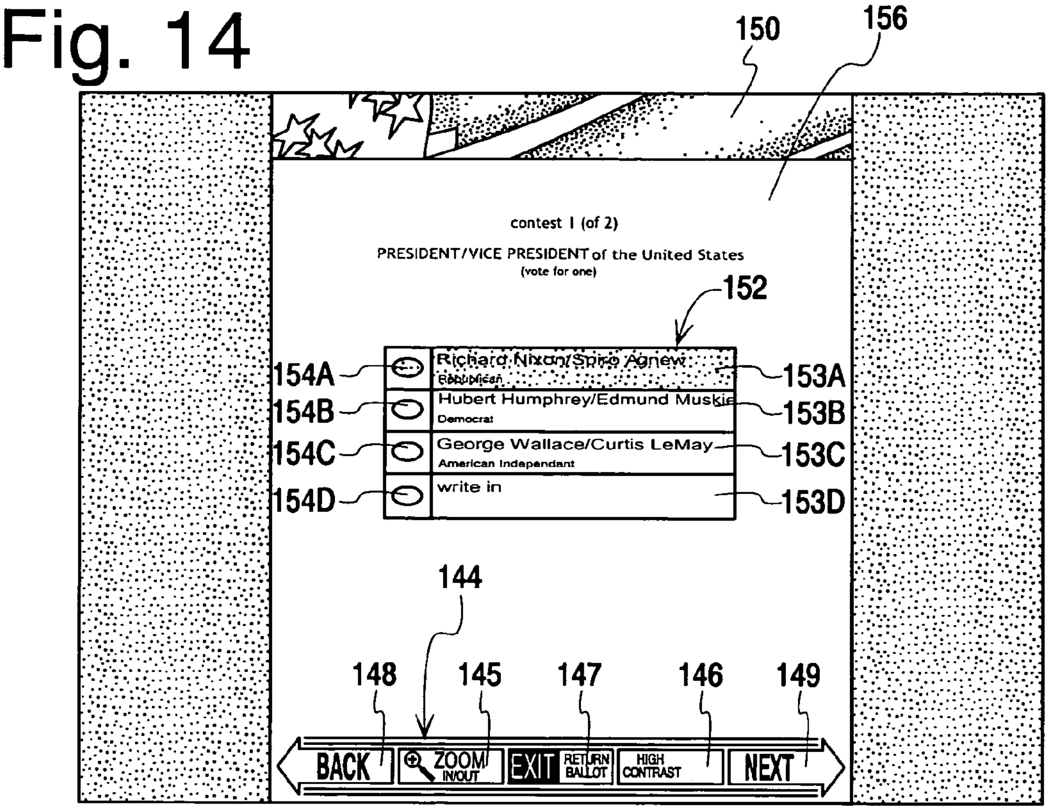
FIG. 14 is a depiction of a subsequent typical display screen showing a contest wherein one of the candidates has been selected by the user.

FIG. 14 illustrates the screen 156 that appears after the voter has touched the section 153 associated with Richard Nixon/Spiro Agnew. As seen, section 153A is highlighted and the oval 154A is marked. It is possible to make the same selections utilizing the navigation keys in user interface key switch panel 33. When using this panel, the UP and DOWN keys 76 and 77, respectively (FIG. 9), allow the voter to scroll through sections 153A–153D, the selected sections 153A–153D being successfully highlighted. To make a selection, it is necessary for the voter to depress the SELECT key 80 for a highlighted section, after which the associated oval 154 is marked and the selection is recognized. The UP and DOWN keys also allow the voter to scroll through the functions of function bar 155, except for the NEXT and BACK functions, which are accessed through BACK and NEXT keys 78 and 79 of user interface panel 33.

It should be noted that when using the "sip and puff" interface provided by the ADA jack 55, the BACK function 148 and NEXT function 149 are scrolled through as well, and the scrolling is closed-loop, since the only functions available to the user are uni-directional scrolling and SELECT.

Figure 15A:
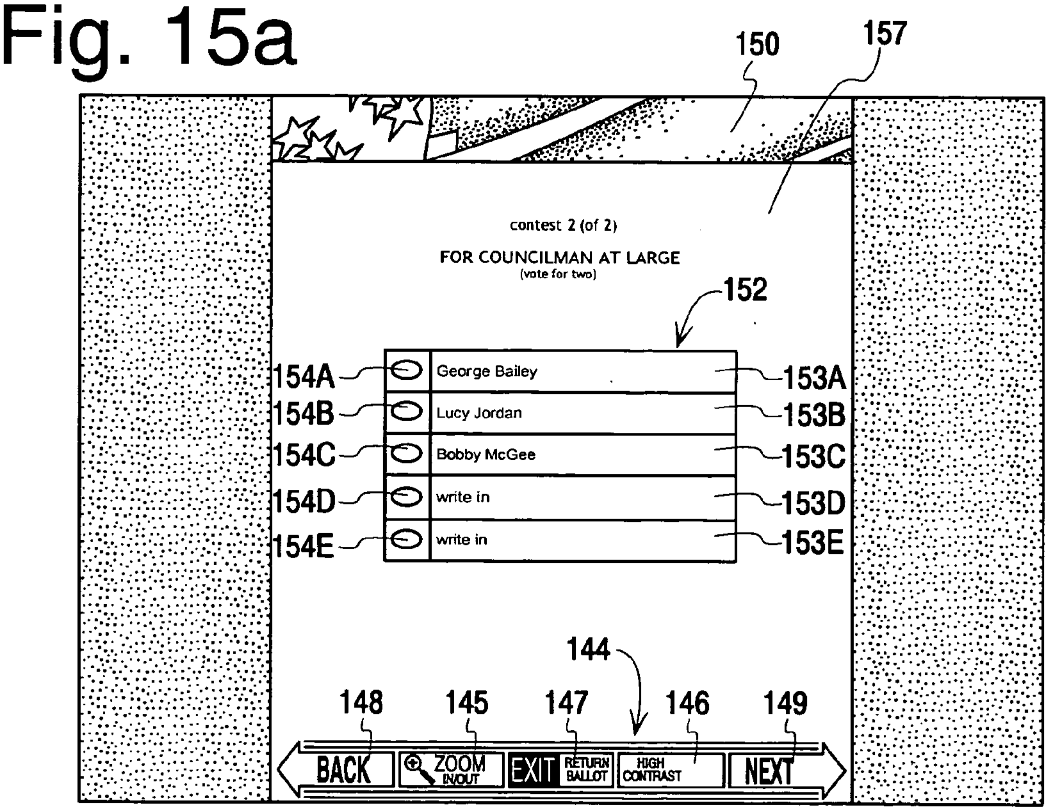
FIG. 15*a* is a depiction of a display screen of a contest wherein two candidates are to be selected.
Figure 15B:
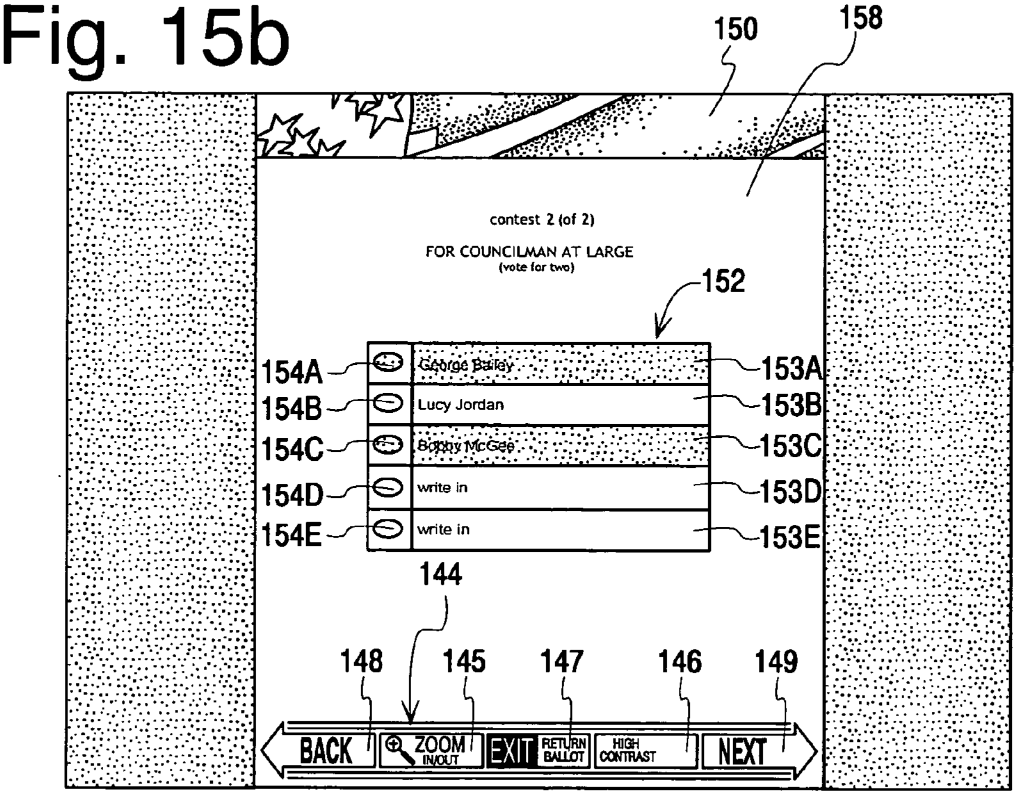
FIG. 15*b* is a depiction of a display screen similar to FIG. 15*a* wherein two candidates have been selected.

Referring to FIGS. 15*a* and 15*b*, a contest where two candidates are to be selected utilizes a screen similar to 156. However, in this case, two selections can be made in the manner previously described for FIG. 14. Should the voter attempt to make a third selection, a prompt will appear in the form of a pop-up instructing the voter that he must first deselect one of the candidates he has previously selected. To deselect a candidate, it is only necessary for the touch screen user to touch one of the previously selected candidates, causing that candidate to be deselected after which he is free to make another selection. For the voter using the voter interface panel 33, it is necessary that he or she first scroll to the candidate to be deselected utilizing the UP and DOWN keys 76 and 77, and then utilize the SELECT key 80 to deselect that candidate. Subsequently, the interface keyboard user can scroll to a newly selected candidate and against depress SELECT key 80 to select that candidate. A voter utilizing the ADA "sip and puff" interface scrolls through the candidate selections and function bar icons in one direction and in a closed loop. The voter continues scrolling through the function selections of function bar 144 until reaching the first candidate on the list, at which time he or she reaches the candidate to be deselected. The "sip and puff" interface is then used to select that candidate for deactivation and the uni-directional scrolling is continued until the newly selected candidate is in position for selection. To move to the next contest, the "sip and puff" interface user then scrolls to the NEXT function icon and actuates select. In the event the voter has made two selections, the screen appears as shown in FIG. 15*b*, the screen 158 showing two candidates highlighted and selected.

Figure 16A:
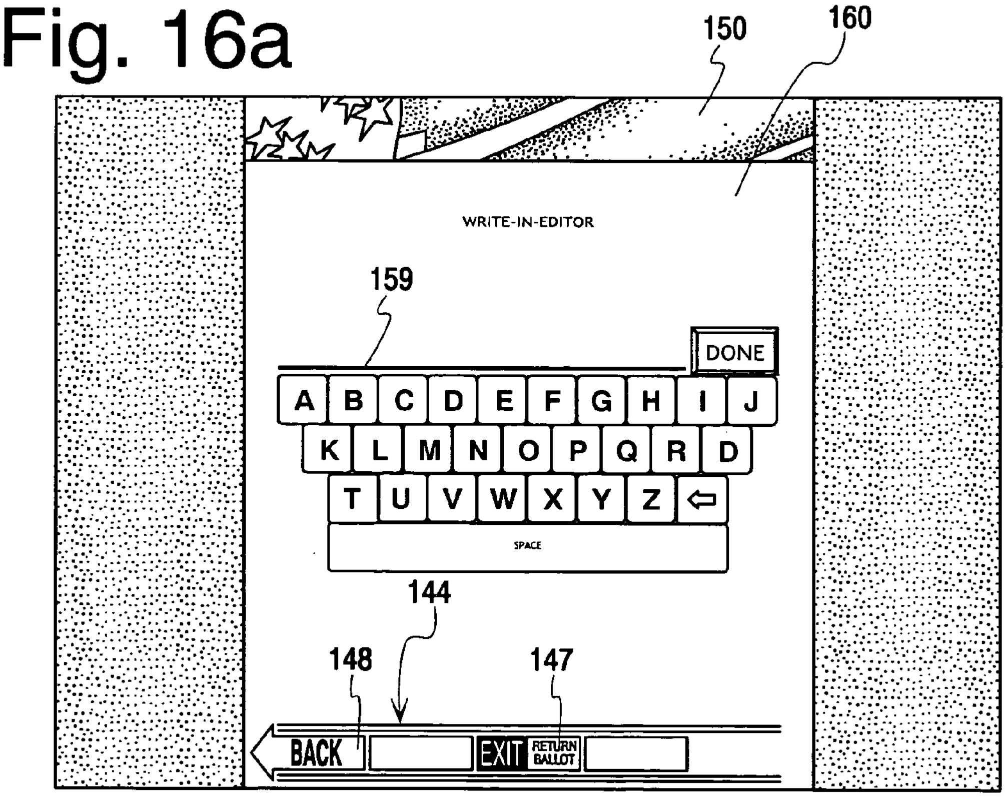
FIG. 16*a* is a depiction of a display screen wherein a pop-up display has appeared to enable selection of a write-in candidate.
Figure 16B:
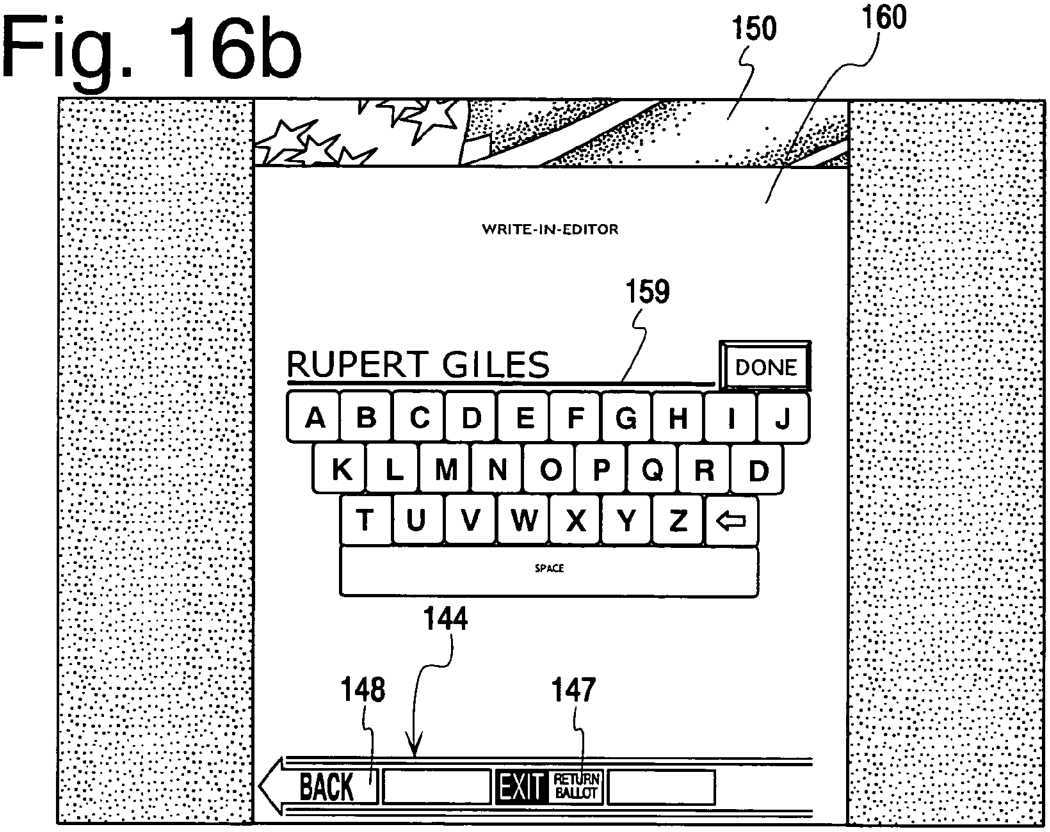
FIG. 16*b* is a depiction of a display screen similar to FIG. 16*a* illustrating the entry of a write-in candidate.
Figure 16C:
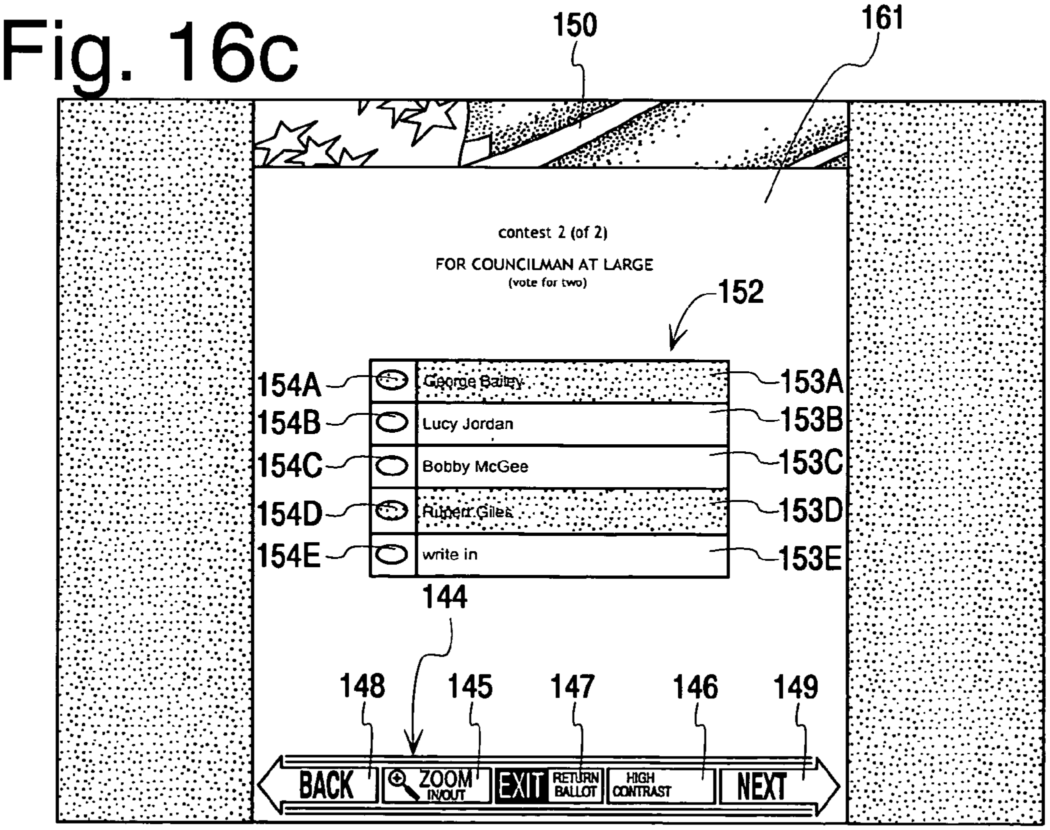
FIG. 16*c* is a depiction of a display screen similar to FIG. 15*b* showing the contest following the entry of a write-in candidate.

Referring to FIGS. 15*b*, 16*a* and 16*b*, to select a write-in candidate, the voter touches a write-in section 153D. With section 153D then highlighted, the associated oval 154D is not marked. For voters using keypad 33, or keypad 65, it is necessary to scroll to write-in section 153D, and then SELECT. After a short time delay, a pop-up display in the form of a keyboard 159 appears as shown by screen 160. The voter next selects the letters of the write-in candidate's name, one letter at a time, until the entire name appears on display 160, as shown in FIG. 16*b*. When the voter has completed typing in the name of the desired write-in candidate, he or she touches the done space, causing the pop-up to disappear after a short delay and the write-in candidate's name to appear in the previously selected write-in section 153D (FIG. 16*c*). The associated oval 154D is preferably marked so that the voter has successfully selected the write-in candidate. The NEXT icon 149 now flashes, prompting the voter to continue to the next contest. It should be noted that, while the write-in process is occurring, the NEXT function is not available. However, the ZOOM, HIGH CONTRAST and EXIT functions remain available, as does the BACK function 148 which allows the voter to abandon the write-in process and return to the contest selections shown on screen 161 in FIG. 16*c*. It should be noted that, once the voter has returned to the contest and both permitted selections have been made, the NEXT icon 149 flashes to prompt the voter to move on to the next contest.

Depending on the jurisdiction, in some instances where the voter attempts to move to the next contest without having made the permitted number of selections, i.e., under-votes, a pop-up screen may appear alerting the user to that fact. It then remains for the user to indicate or confirm on that pop-up display that it is his or her intention to vote for a lesser number of candidates than permitted by the contest. In those situations where such a prompt is used for under-voting, the NEXT icon 149 does not appear until the prompt has been confirmed.

In those situations where the voter has attempted to vote for more than the permitted number of candidates, i.e., over-vote, a pop-up prompt appears notifying the voter of the attempt to over-vote and indicating to him or her that a previously selected candidate must first be deselected before another candidate can be selected. This over-vote prompt may disappear after a short time period allowing the voter to deselect a previously selected candidate or actuate the NEXT icon 149 to move on to the next contest.

Figure 17:
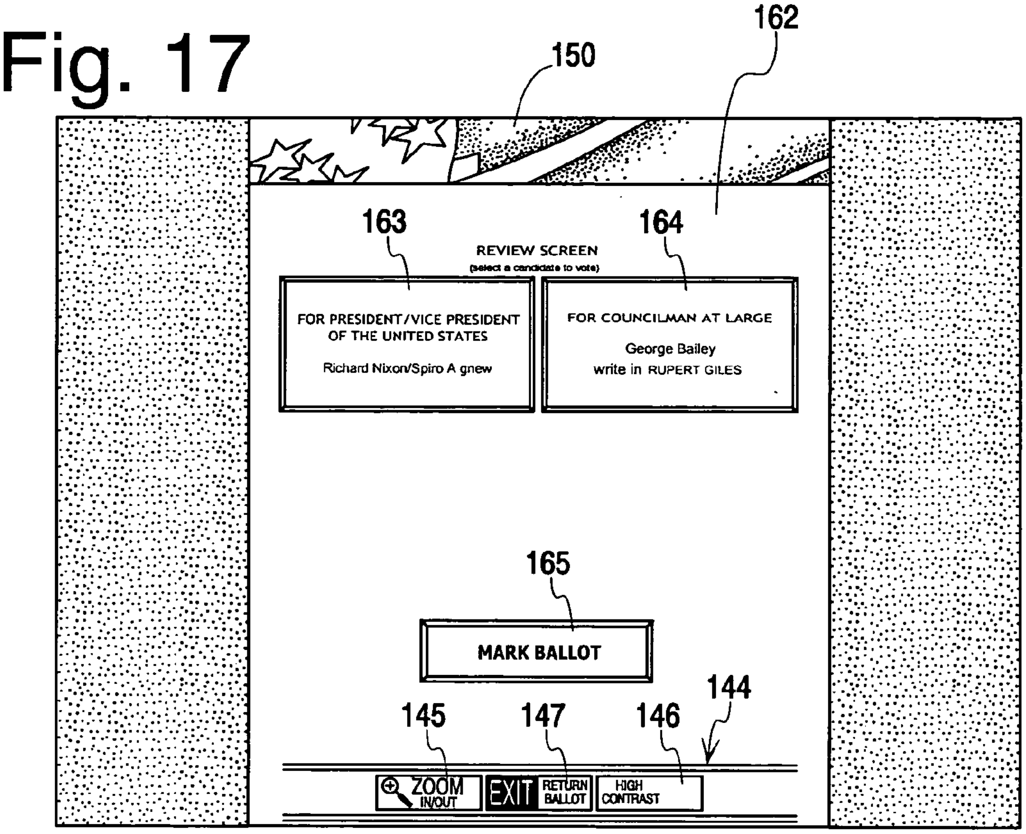
FIG. 17 is a depiction of a typical display screen showing a summary of selections previously made in individual contests of an election.
Figure 18:
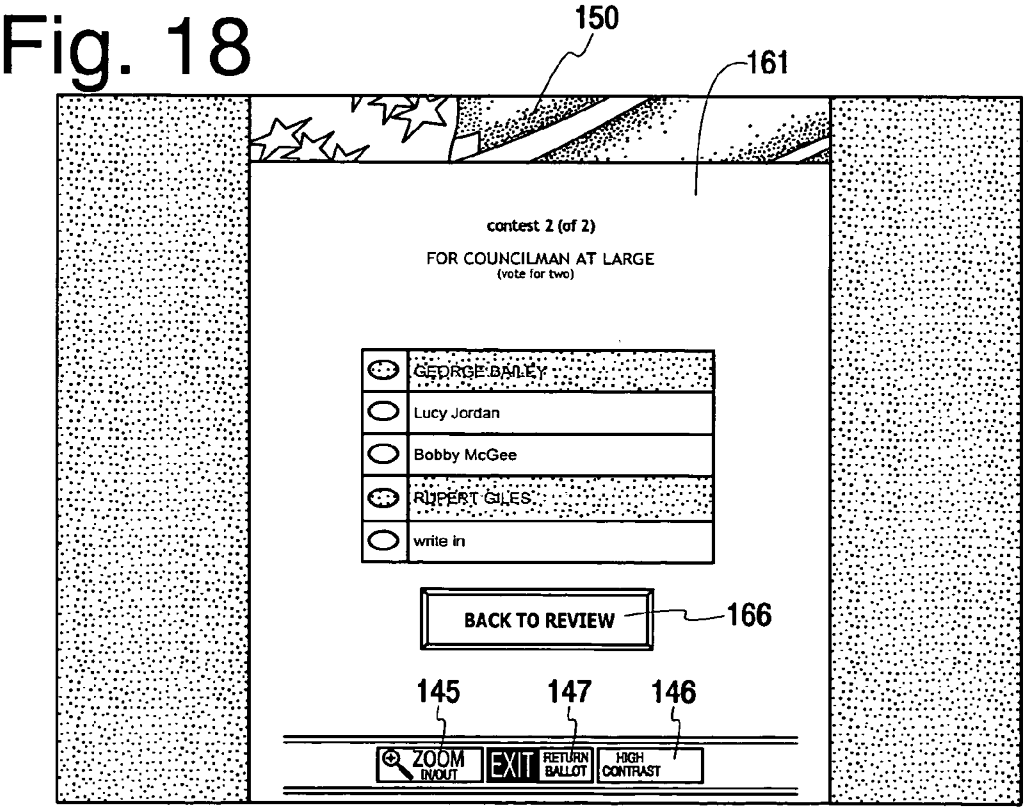
FIG. 18 is a depiction of a typical display screen which occurs following the return to an individual contest from the summary screen of FIG. 17.
Figure 19:
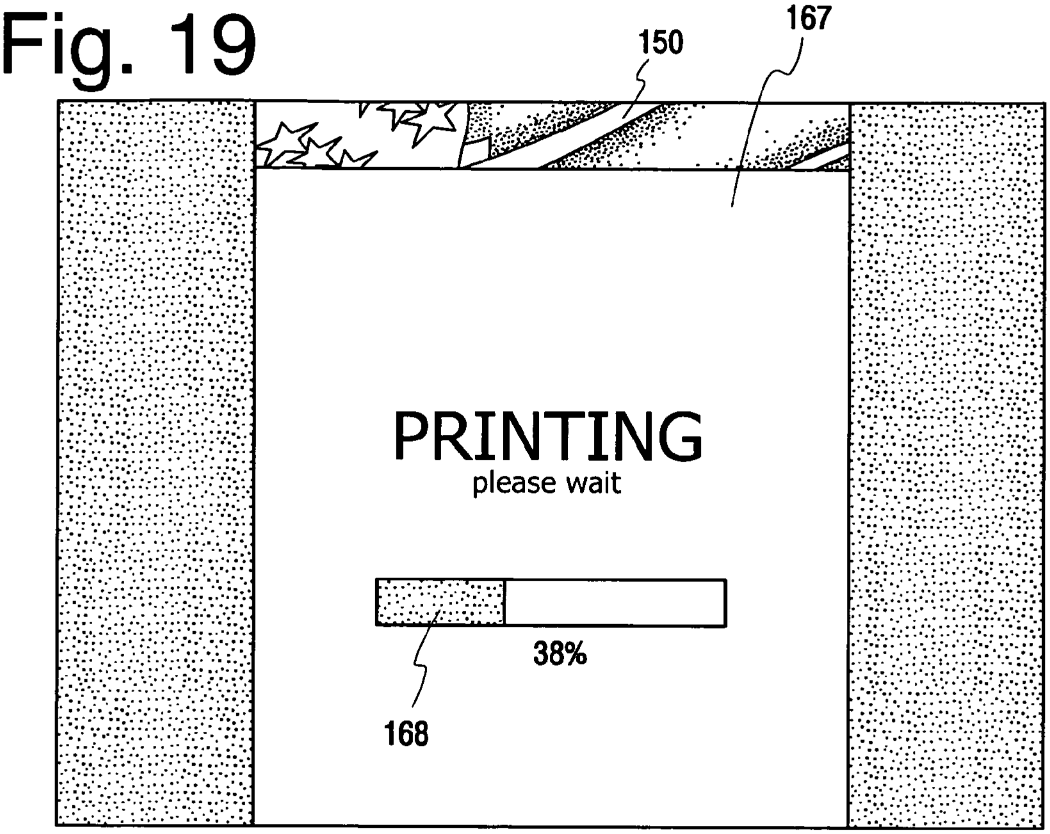
FIG. 19 is a depiction of a typical display screen utilized to provide an indication to a voter that the ballot marking terminal is currently marking his or her ballot.

After the voter has completed selections in all available contests, the selection process advances to a summary screen 162, as shown in FIG. 17. The summary screen includes a summary box for each contest, the selections for that contest being displayed in the box. Summary box 163 for the contest depicted in FIGS. 13*a* and 13*b* shows the voter's selection for that contest. Summary box 164 for the contest depicted in FIGS. 15*a*, 15*b* and 16*a*–16*c* shows the voter's selections for that contest. The voter can accept his selections for the two contests by touching the MARK BALLOT function 165 provided in screen 162 of FIG. 17 and his previously inserted ballot will be marked in accordance with his selections and then returned to him through ballot feed slot 45. Or, when required by the election jurisdiction, the voter can be prompted to advance to a confirmation screen and then prompted to confirm that he wants his ballot to be printed in compliance with his selections. It should be noted that in this screen the BACK function 148 and the NEXT function 149 are not available since the voter can only return to his or her previous selection by touching the appropriate summary box. For example, by touching box 164 the voter is returned to screen 161 (FIG. 18) where his or her previously entered selections remain displayed. He or she may then change these selections in the manner previously described or, in the event they are satisfactory to the voter, he or she may touch the BACK TO REVIEW icon 166 to return to the selection summary screen 162. It should be noted that the BACK function 148 and NEXT function 149 are not available on this screen 161 since the only action available to the voter is to return to summary screen 162.

Once the voter has returned to summary screen 162, he or she may touch MARK BALLOT icon 165, or confirm on a subsequent page, and the ballot will begin to be marked. During the marking process, a screen 167 is displayed to indicate to the voter that the printing process is occurring. Preferably, this screen includes a progress bar 168 to indicate the time remaining before the ballot is returned to the voter. None of the functions provided by function bar 144 are available on screen 167.

Figure 20:
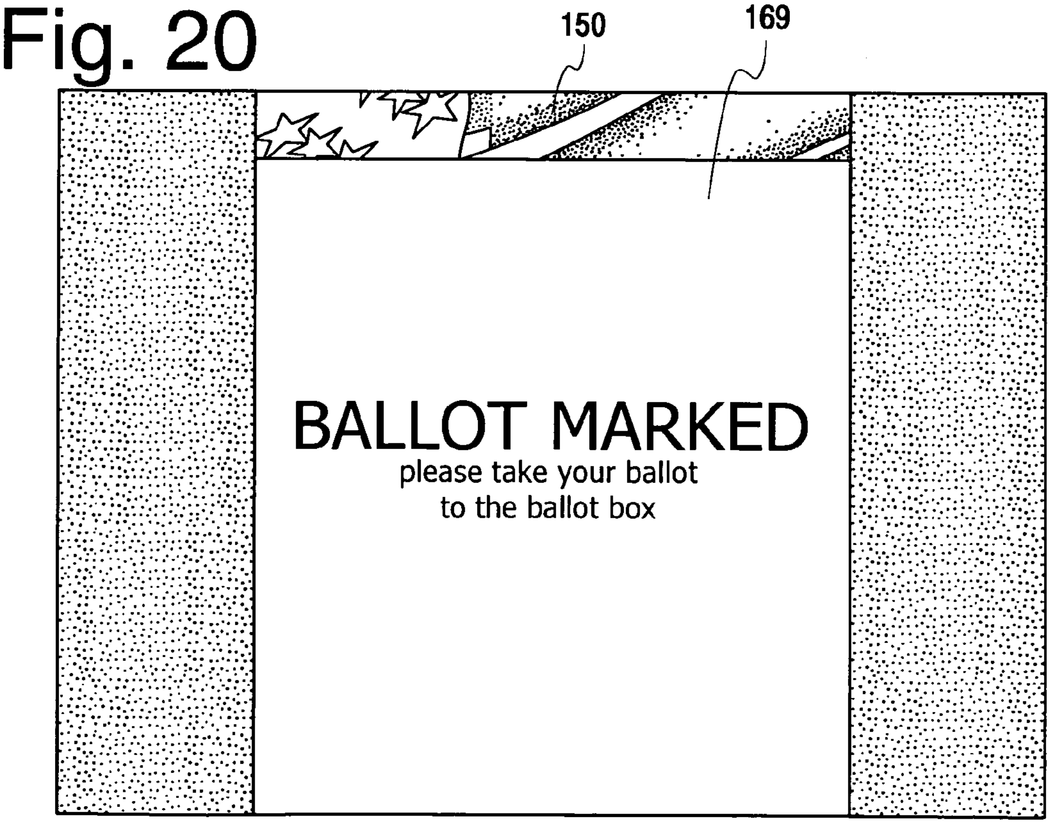
FIG. 20 is a depiction of a typical display screen providing an indication to a voter that the ballot has been marked and is being returned to the user.

After the ballot has been marked, the ballot marked indication may be provided on a screen 169, as shown in FIG. 20, prompting the voter to remove the ballot from the ballot tray 44 and take the machine-marked ballot to the scanner or ballot box for subsequent tabulation. Once the ballot has been removed from ballot marking terminal 30, the display screen 151 reverts to the introduction screen 143 shown in FIG. 12.

It will be appreciated that while a series of screens have been shown which provide for voter selection of candidates on an inserted ballot, in practice the composition of the screens may be changed to meet the special requirements of a particular voting jurisdiction. Moreover, additional or alternative functions, including party voting or the random appearance of candidates on a screen for a particular contest, can be readily incorporated in ballot marking terminal 30 by means of conventional programming techniques.

Figure 21A:
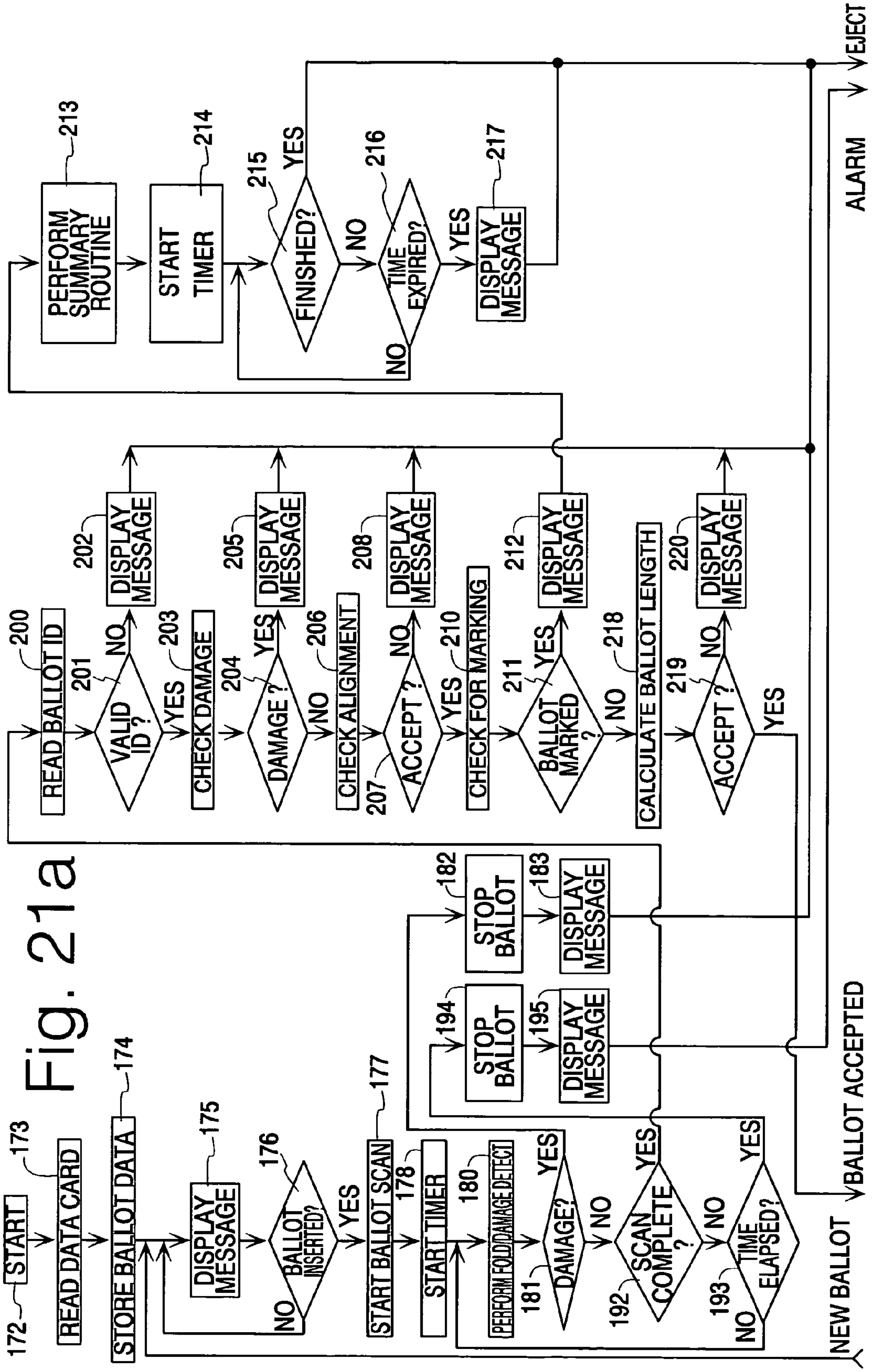
FIGS. 21*a*–21*c* show a simplified functional block diagram of the operation of the principal systems and subsystems of the ballot marking terminal of FIGS. 1 and 2.
Figure 21B:
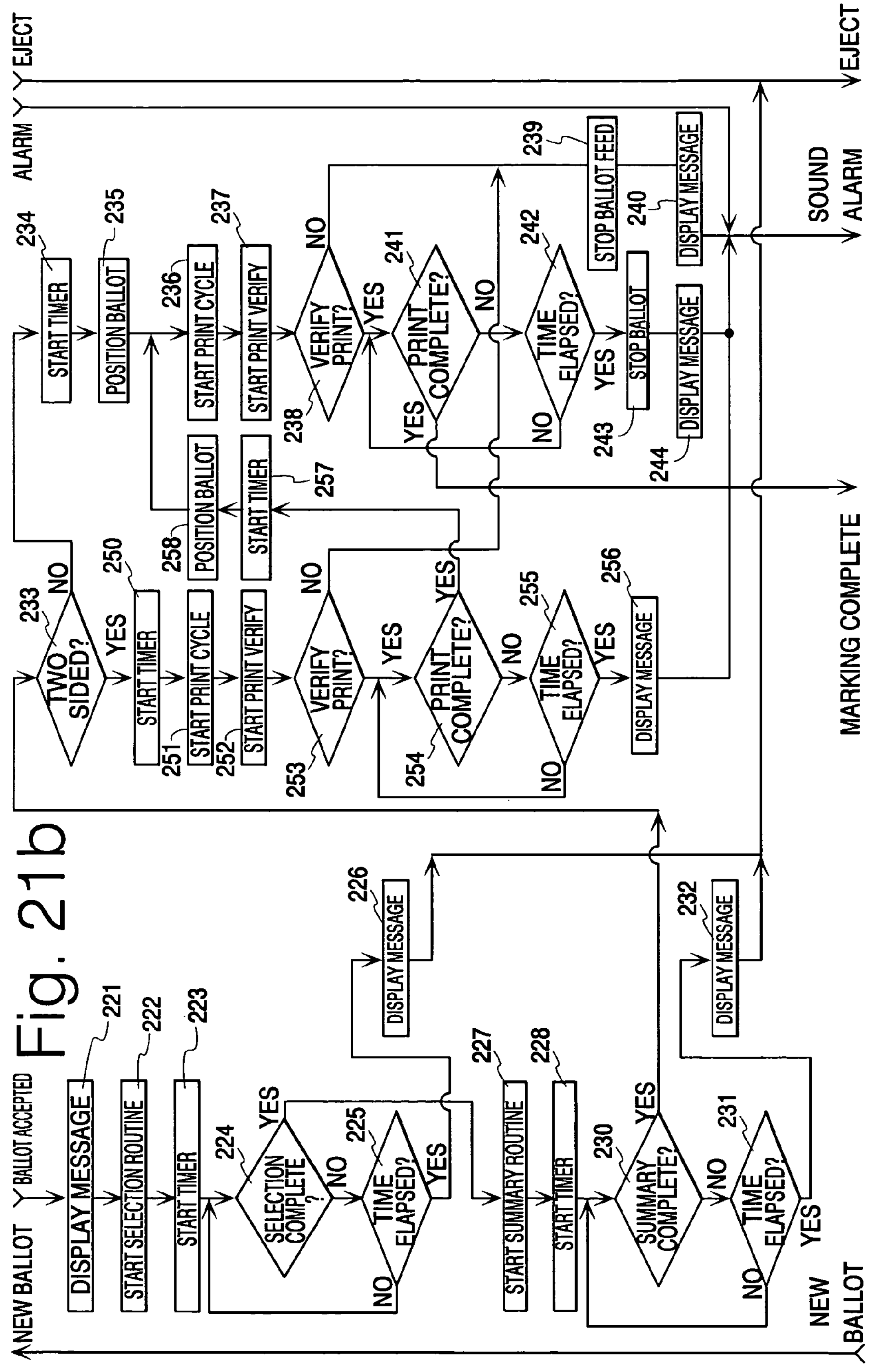
Figure 21C:
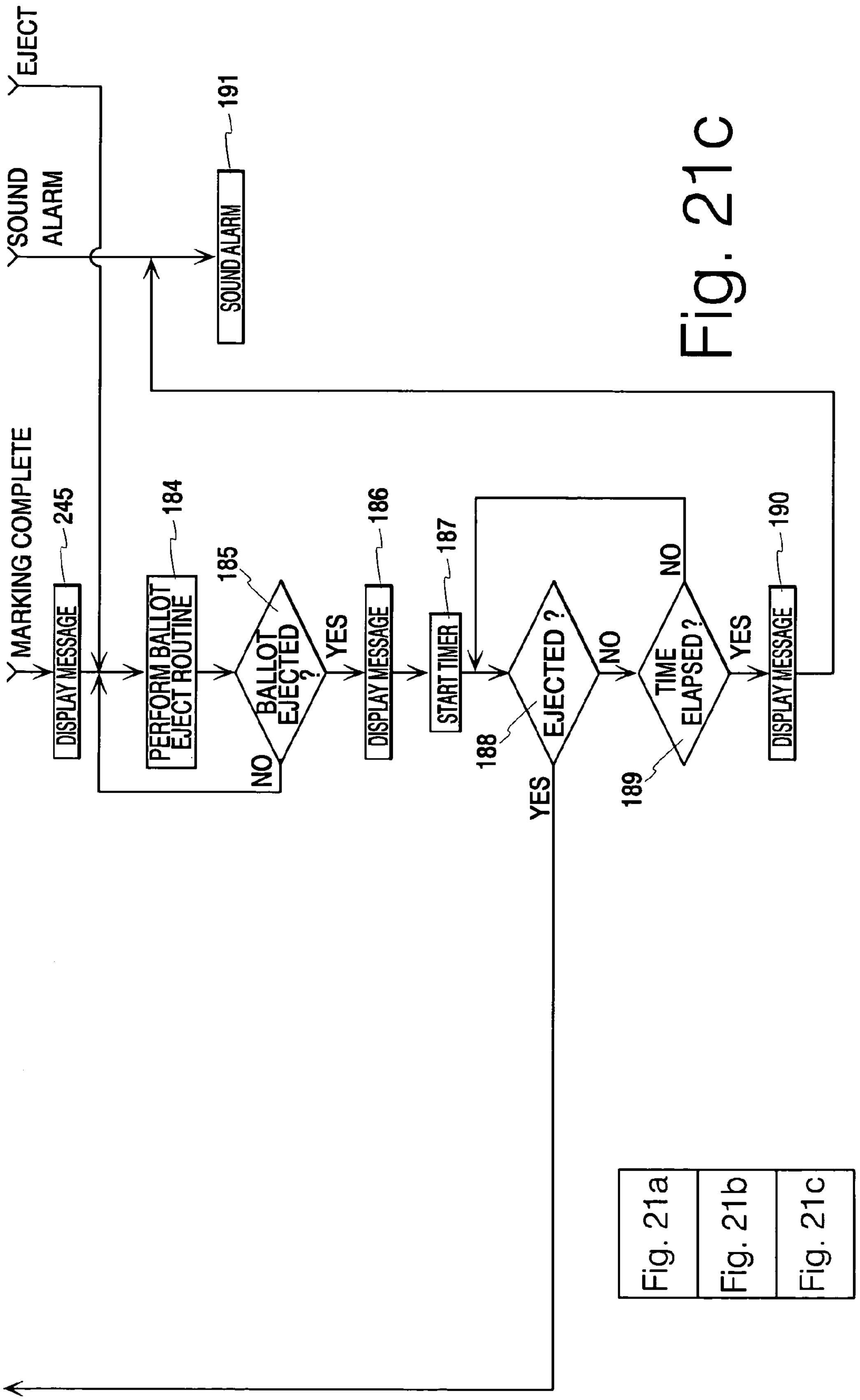

The functioning of ballot marking terminal 30 may be understood by reference to the simplified flowchart shown in FIGS. 21*a*–21*c*. Prior to operation, a pre-programmed compact flash card 170 is installed in a socket 171 (FIG. 7) to provide information on the layout of each ballot style to be processed by the ballot marking terminal. On power-up of the terminal at 172 the compact flash data card is read at 173 and the appropriate ballot information required for processing the ballot styles to be input to the terminal is loaded into RAM within the computer module 138 at 174. The screen 140 depicted in FIG. 10 is now displayed at 175 pending insertion of a ballot. Upon insertion of a ballot at 176, the ballot is caused to pass between scanners 111 and 112 at 177 and then data derived from the scan is stored in a bitmap. At the same time, a timer function is started at 178 and an analysis is made of the scanned image for damage or folding at 180, and in the event damage is detected at 181, further movement of the ballot is stopped at 182, a message is displayed at 183, and the ballot is returned to the voter at 184. When ejection of the ballot is detected at 185, a message is displayed at 186 on the LCD display screen 141 to instruct the voter to remove the ballot.

At the same time, a timer function is started at 187 and, in the event that the ballot has not been removed by the voter at 188 and the time has elapsed at 189, a further message is displayed at 190 and an alarm is sounded at 191. In the event the ballot has been removed at 188, the message displayed at 175 reappears, and the ballot marking terminal 30 is available to process another ballot.

In the event that damage is not detected at 181, the scan is not complete at 192 and the time allocated for completion of the scan has elapsed at 193, motion of the ballot is stopped at 194 and a message is displayed at 195 advising the voter and election officials that an error has occurred within the terminal. At the same time, an alarm is sounded at 191 to alert polling place officials that attention to the ballot marking terminal is required.

In the event the scan is complete at 192, then the ballot I.D. is read from the bitmap generated by scanners 111 and 112 at 200. The I.D. is checked for validity at 201 to determine whether the ballot style is valid for the particular polling place in which ballot marking terminal 30 has been installed. If the ballot I.D. is not valid, a message is displayed at 202 and the ballot is ejected in the manner previously described at 184. If the ballot I.D. is valid, then the bitmap data is checked to determine whether the ballot is damaged or otherwise not complete at 203. If the ballot is determined to be damaged at 204, then a message is displayed to this effect at 205 and the ballot is ejected from the terminal at 184 in the manner previously described. If the ballot is found to not be damaged at 204, then print alignment is checked at 206 and found to be outside of acceptable limits at 207, the message is displayed at 208 and the ballot is ejected from the terminal at 184 in the manner previously described.

If ballot alignment is within limits at 207, then the ballot is checked for selections having been marked, i.e., ovals filled in, at 210. If the ballot is found to be marked at 211, then a message is displayed to this effect at 212 and the ballot marking terminal 30 reverts to a summary routine 213. During this summary routine, markings existing on the ballot are read and the corresponding selections are displayed to the voter on a screen similar to screen 162 depicted in FIG. 17, with the exception that the marked ballot function 165 is not provided and instead a return ballot function (not shown) is displayed instead. At the same time, a timer is started at 214. When the voter has confirmed the summary at 215, the ballot is ejected at 184 in the manner previously described. In the event the voter has not requested return of the ballot at 215 and the time allotted for his review of the summary has expired at 216, a message is displayed at 217 and the ballot is ejected at 184 as previously described.

In the event that the ballot is determined to not be marked at 211, the ballot length is calculated from the scanned image at 218 and the length is found to not be within allowable limits at 219, then a message is displayed at 220 and the ballot is ejected at 184 in the manner previously described. In the event the ballot length is found to be within acceptable limits at 219, then a message is displayed at 221 (FIG. 21*b*) and the voter selection routine is begun at 222. At the same time, a timer is started at 223. If the voter has not completed the selection process at 224, and the time allotted for his selections has elapsed at 225, then a message is displayed at 226 informing the voter of the time having elapsed, and the ballot is ejected at 184 in the manner previously described.

In the event that the voter has completed selecting candidates from the contests presented to him at 224, then the selection summary routine is initiated at 227. At the same time, a timer is started at 228. If the summary has not been accepted by the voter at 230, and the time allocated for the voter reviewing the summary has elapsed at 231, then a message is displayed at 232 advising the voter that his review time has elapsed and the ballot is ejected from the terminal 184 in the manner previously described. In the event the voter has approved the summary at 230, then a determination is made whether the ballot is two-sided, i.e., printed on both the front and back sides, at 233. If the ballot is not two-sided, then a timer is started at 234, and the front side of the ballot is positioned in front of the print head at 235 by actuation of the ballot transport mechanism within the terminal. If the ballot has been inserted front side up, then the ballot must be first advanced around the ballot reversing loop and then back to the print head. When the ballot has been properly positioned, the front of the ballot is printed by the printer at 236 as the ballot is caused to pass beneath the print head 101. At the same time, print verification scanner 113 is caused to verify operation of the printer at 237 as the ballot continues past the printer along paper path 85. In the event an error is detected in the operation of the print head at 238, further movement of the ballot is stopped at 239 and a message is displayed at 240 advising the voter and election officials that a print error has occurred. At the same time, an alarm is sounded at 191 to alert officials to the malfunction. In the event the operation of the print head is verified at 238, printing has not been completed at 241, and the time allocated for the ballot to be repositioned and printed on the one side has elapsed at 242, then the ballot is stopped at 243, and a message is displayed at 244 advising the voter of a terminal malfunction. An alarm is sounded at 191 to alert election officials. In the event the print cycle has been completed at 241, then a message is displayed at 245 (FIG. 21*c*) and the ballot ejection routine 184 is performed in the manner previously described.

In the event that the ballot is determined to be two-sided at 233, then a timer is started at 250, a print cycle for printing the bottom side of the ballot is started at 251 and a print verify routine is started at 252. In the event that the operation of print head 101 is not verified at 253, movement of the ballot is stopped at 239 and a message is displayed at 240 in the manner previously described. In the event the operation of the print head is verified at 253 and the print cycle has not been complete at 254 and the time allocated for printing the back side of the ballot has elapsed at 255, a message is displayed at 256 to alert the voter to a terminal malfunction and an alarm is sounded at 191 in the manner previously described. In the event the print cycle is determined complete at 254, then a timer is started at 257, and the ballot is positioned at 258 to be in position for the starting of the print cycle 236 which prints the front side of the ballot. This print cycle and the concurrent validation at 237 continues in the manner previously described for a single-sided ballot. In the event the ballot is inserted inverted, i.e., front side down, then the print head prints the front side of the ballot on the first pass, and the back side of the ballot on the second pass. In this case, if desired by the election authority, the ballot can be advanced around the reversing loop a third time so that the ballot will be ejected front side up.

Thus, as shown in FIGS. 21*a*–21*e*, ballot marking terminal 30 functions to receive a pre-printed unmarked ballot, identify the ballot, and by reference to data stored on a compact flash data card installed in the terminal, to present a series of screens or audio prompts to a voter to enable the voter to make selections which are presented in summary form to the voter, and if approved, appropriately marked on the ballot. The ballot is then returned to the voter to deposit in a scanner or ballot box for subsequent tabulation. No record of the voter's selections is maintained in the terminal 30.

Figure 23:
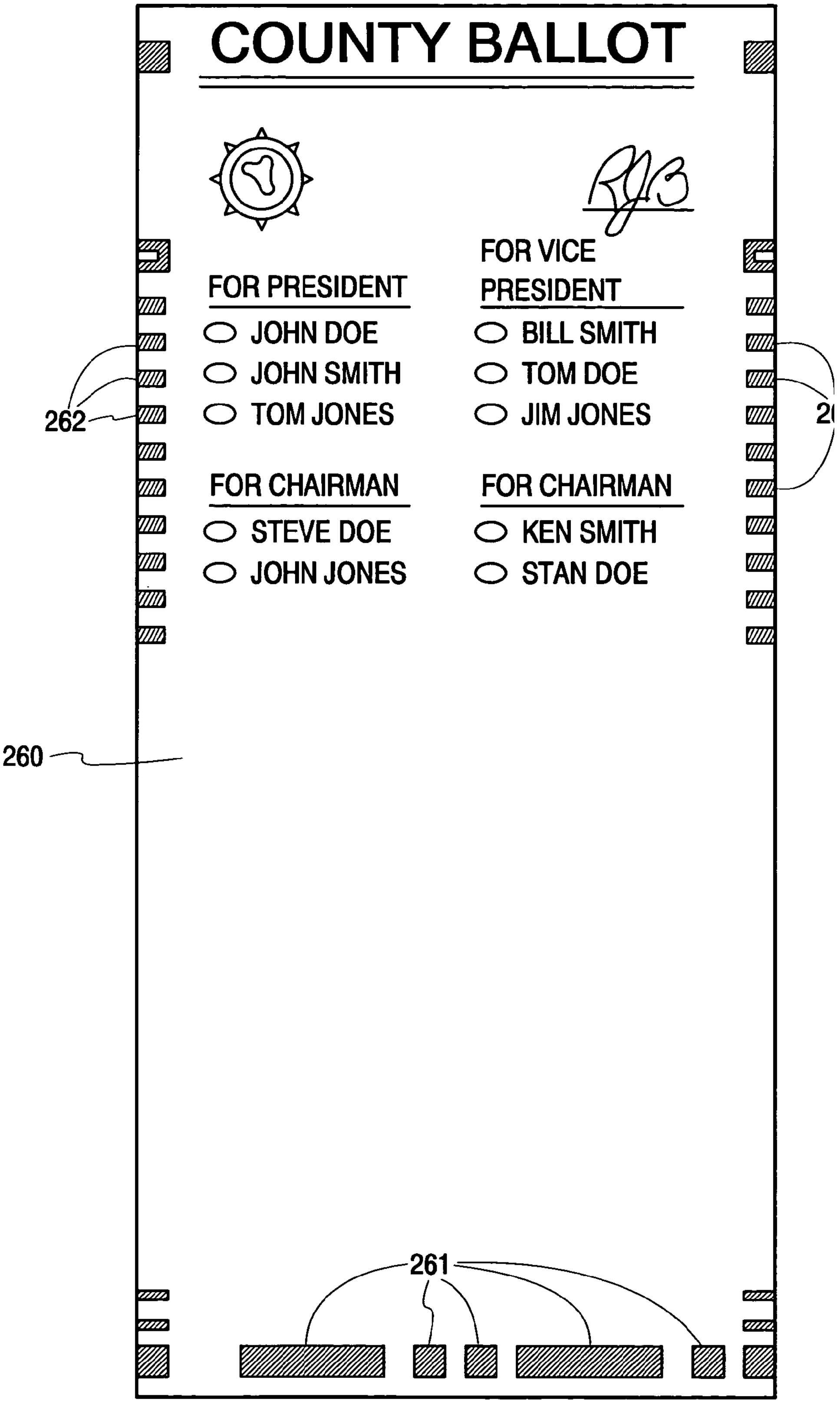
FIG. 23 shows a typical pre-printed ballot for marking by the ballot marking terminal of FIGS. 1 and 2.

Ballot marking terminal 30 is capable of processing a variety of ballots of different lengths and widths. Furthermore, such ballots may have a variety of formats for identifying their particular style or layout for purposes of the terminal knowing which contests are presented on the ballot. Referring to FIG. 23, one ballot style 260 may be identified, for example, by a bar code 261 provided on the trailing edge of the ballot. In accordance with conventional practice, ballot style 260 may also incorporate sync marks 262 along one or both edges to assist in identifying the location of candidate marking spaces.

Figure 22A:
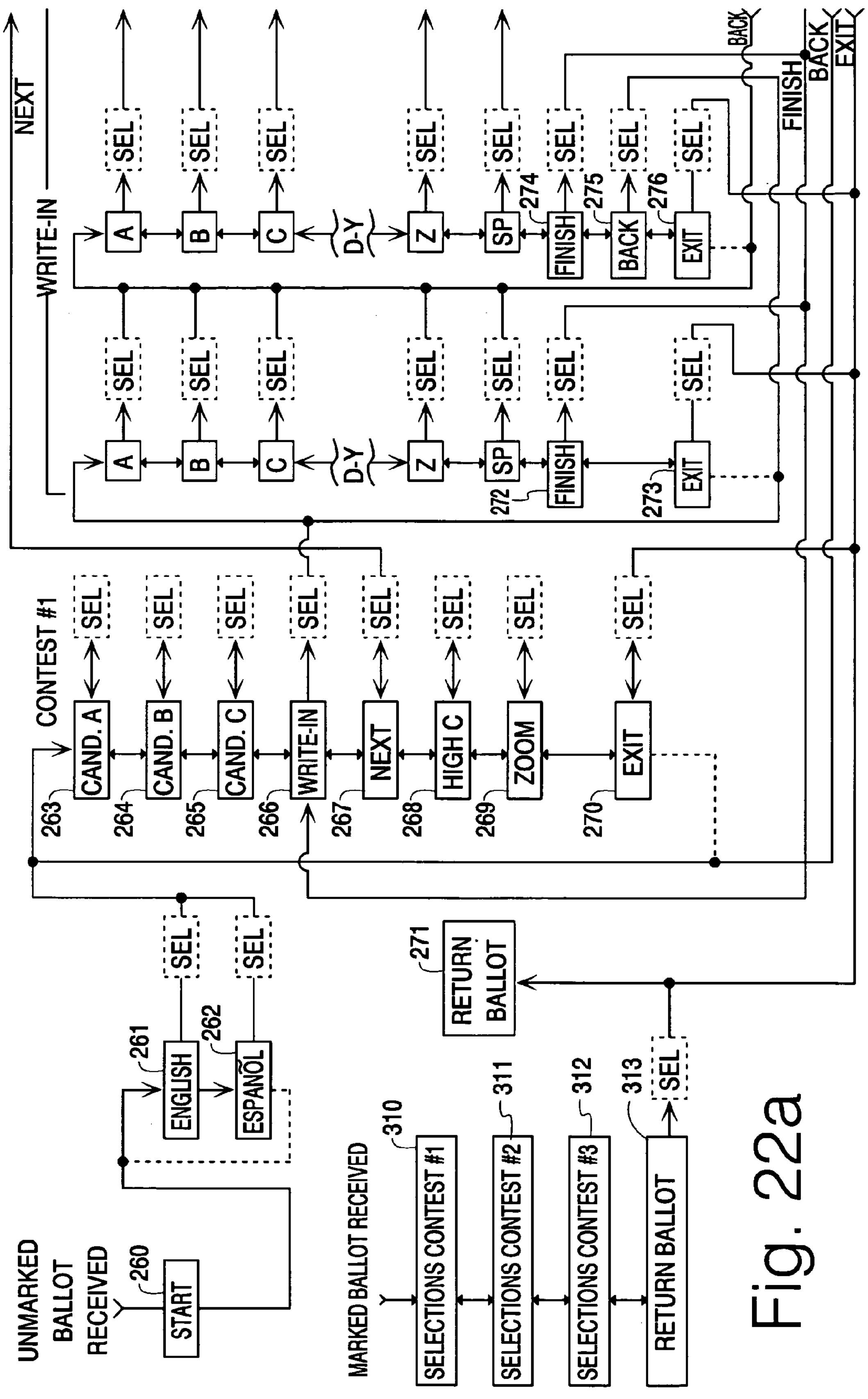
Figure 22B:
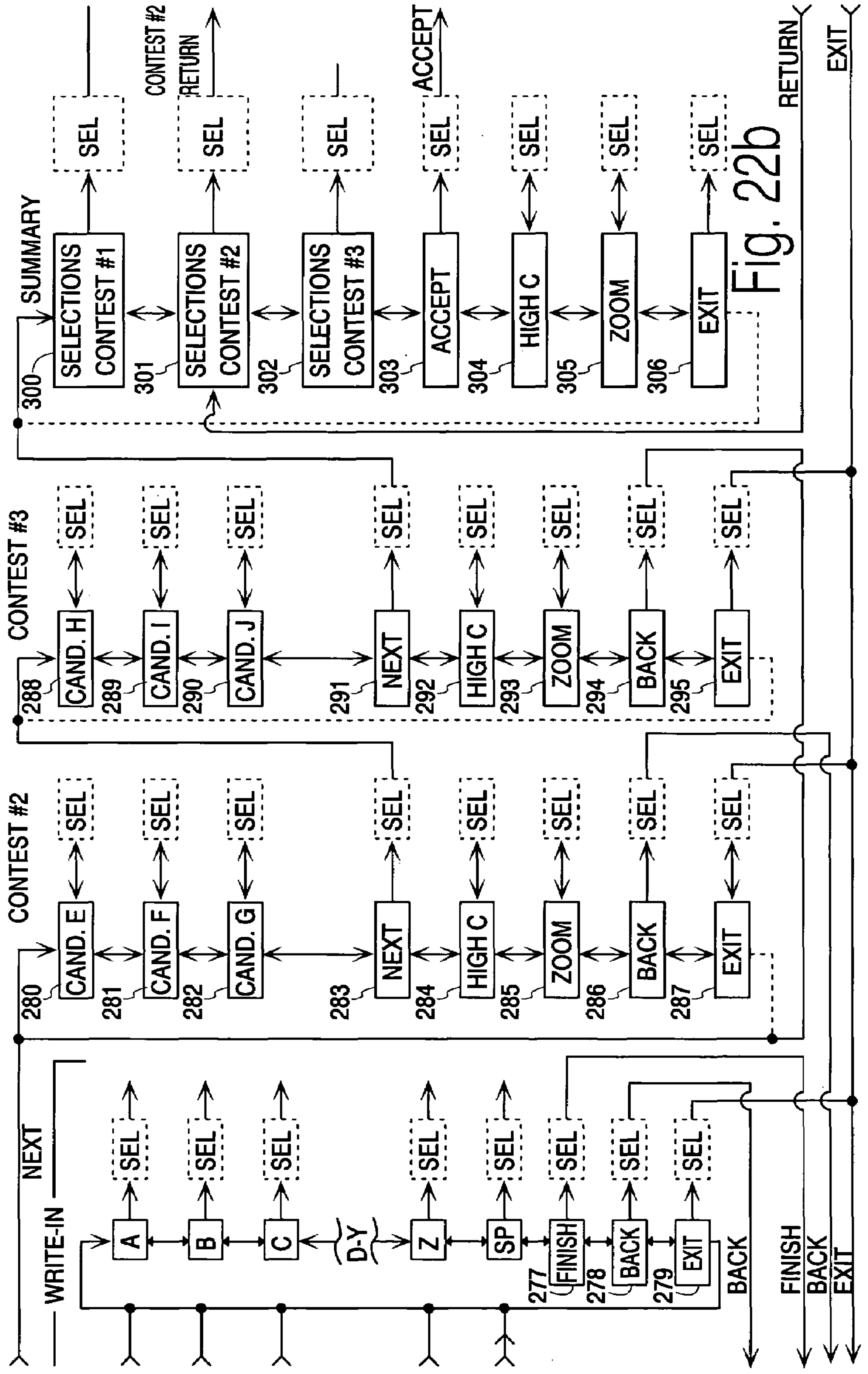

Referring to FIGS. 22*a*–22*c*, the ballot marking terminal 30 provides interfaces by which a voter can make selections on a pre-printed paper ballot using either a touch screen visual interface, and audio keyboard interface or a two-contact audio or video "sip and puff" ADA interface. The three interfaces work in a coordinated manner to allow selections to be marked in the most efficient manner possible by the voter. In particular, with reference to FIGS. 22*a*–22*c*, after an unmarked ballot is received, an initial message is displayed at 260, and the terminal automatically progresses to a language selection screen such as that shown in FIG. 11. The voter now selects between languages, in this case, English or Spanish. Using the touch screen, it is only necessary to touch the English selection and the selection is acknowledged, and the terminal proceeds, with the possible exception of intervening instruction pages, to the first contest. When the voter is making his or her selections by means of a voter interface keypad 33, the voter scrolls through the language selections, which are highlighted if the screen is activated, or which are only audio prompts if the screen is blank, until the desired language has been highlighted or the desired audio prompt has been spoken, at which time the voter depresses the select key 80 (FIG. 9) and the selection is recognized. Subsequent instruction pages, if any, are presented in the selected language and contest number one is made available to the voter. The SEL functions are contained within broken lines to indicate that they are only required in the event the keypad is utilized or the "sip and puff" interface is in use. In the case of the "sip and puff" interface, the voter scrolls through the selections, in this case, English and Spanish, until the desired selection occurs. Scrolling is done in one direction only so that after the last selection has been scrolled to, the next scroll command brings the voter back to the first selection. This closed-loop scrolling is shown in dotted lines where applicable.

The same logic applies to contest number one. Using the touch screen, the voter may directly select any one of the four candidates 263–266, the NEXT function 267, the HIGH CONTRAST function 268, the ZOOM function 269 or the EXIT function 270. As previously described, where the candidate's name is touched on the touch screen, the candidate's name is framed in color and the associated oval is marked. Where a write-in candidate is selected, the screen reverts to a write-in screen wherein the letters A through Y may be scrolled through as well as a space, finish and delete function. When the NEXT function is selected, the screen displays contest number two. When the HIGH CONTRAST function is selected, the screen reverts to a monochrome high contrast image until the high contrast function is actuated a second time. Similarly, when the ZOOM icon is selected, the display is enlarged until the ZOOM function is actuated again. When the EXIT function is selected, a confirmation screen typically pops up and, if exit is confirmed, the ballot is returned at 271 to the voter.

When selections are made in contest number one using the navigation keys, the voter scrolls up or down through selections 263–270 using the arrow-shaped UP and DOWN keys 76 and 77. The candidates and functions thus selected by keypad scanning are highlighted as they are scanned, but are not selected. To select the candidate or function, it is necessary to depress the SELECT key 80. If the display has been blanked by actuation of the SCREEN blank key 81, then the high contrast and zoom functions are skipped in the scanning process and the voter relies on synthesized speech to identify each selection as he scrolls through the list of possible selections. Since the keypad allows the voter to scroll up or down, the selection process is not closed-loop. In the audio mode, when exit is selected, the confirmation audio prompt will follow which must be confirmed before the selection process will be terminated and the ballot returned.

When a voter is making a selection in contest number one utilizing the "sip and puff" ADA interface, scrolling takes place in one direction only. Provided the screen is not blanked, all options 263 through 270 are presented, and following the exit option at 270, the loop is closed to provide candidate A option at 263.

When using voter interface panel 33, the voter may actuate the arrow-shaped NEXT key 79 at any time to proceed directly to the next contest. The BACK function is not available to the voter in contest number one since this is the first contest in the series of contests to be presented to the voter. In the event a voter utilizing the keypad interface 33 actuates the NEXT key 79 prior to making a selection, a visual and/or audio prompt, as appropriate, may be presented and require confirmation to prevent inadvertent under-voting prior to proceeding to the next contest. Likewise, attempts at over-voting are similarly followed by a visual or audio prompt, or both, to enable the voter to remedy the attempted over-vote.

A similar logic applies to the selection of a write-in candidate. When the write-in option 266 is selected, the voter proceeds through the alphabet A–Z, space, finish, and delete. Using the touch screen, the voter need only touch the pop-up keyboard to enter the letters of the write-in candidate. When using the keypad interface 33, the voter scrolls up and down, observing visual and/or audio prompts to make a selection using the select key 80. Using the "sip and puff" ADA interface, scrolling is done in one direction only so that, after the delete function, the next opportunity presented for selection is the A character. As previously described, when the finish function is selected, the display reverts to the location of the write-in candidate and subsequent scrolling within contest number one takes place from there. Movement to the next letter in the candidate's name takes place automatically with the selection of either a letter or space. Selection of the finish function 272 returns the terminal to contest number one and selection of the exit function 273, after confirmation of a subsequent pop-up confirmation display, terminates the selection process and causes the ballot to be returned to the voter at 271.

Selection of the second letter of the write-in candidate's name is accomplished in the same manner as selection of the first character. The functions finish 274, back 275, and exit 276 appear in the scrolling cycle. As before, data entry is direct utilizing the touch screen keyboard and indirect, requiring actuation of the select key 80 utilizing the keypad voter interface and either video or audio prompts, using the keypad or ADA interfaces. As before, in the case of the "sip and puff" interface, the uni-directional scrolling requires that the exit function be followed by a return to the letter A. The back function 275 is available when selecting the second letter since a previous letter has been selected and may require change.

The third letter of the write-in candidate's name is selected in the same manner as the second letter, with finish function 277 (FIG. 22*b*), the back function 278 and a exit function 279 being included in the scrolling process.

After selection of a candidate in contest number one, a selection is made available in contest number two. Three candidates, 280–282, are available for selection, as well as NEXT function 283, HIGH CONTRAST function 284, ZOOM function 285, BACK function 286 and EXIT function 287. These functions are accessed in the manner previously described in connection with contest number one. BACK function 286 is available since a previous contest is now available to return to. Upon selection of the NEXT function 283, either by direct entry on touch screen 141 by scrolling action with keypad 33 and select key 80 or through use of the "sip and puff" ADA interface, the selection process proceeds to contest number three. This contest provides three candidates 288–290, a NEXT function 291, a HIGH CONTRAST function 292, a ZOOM function 293, a BACK function 294 and an EXIT function 295. Access to these functions is provided in the same manner as access to the functions in contest number two.

Upon actuation of the NEXT function 291 in contest number three, the selection process progresses to a summary screen wherein the selections previously made in contests one, two and three are displayed to the voter. The voter can directly select on touch screen 141, or by means of keypad interface 33, scroll through the various contest summaries 300–301, and ACCEPT function 303, a HIGH CONTRAST function 304, a ZOOM function 305 and an EXIT function 306. Should the voter wish to change his or her selection in a particular contest as, for example, contest number two, the voter selects this contest, either directly on touch screen 141 or through scrolling action by means of keypad interface 33 or "sip and puff" ADA interface 55 to cause the terminal to return to the contest so that the voter can makes changes if desired. In this case, the summary process directs the terminal to contest number two (FIG. 22*c*) wherein three candidates 280–282 are presented for selection along with a RETURN function 283, a HIGH CONTRAST function 284, a ZOOM function 285 and an EXIT function 286. Selection within this contest is now done in the same manner as the previous selection, except that the NEXT function 283 is replaced with a RETURN function 307 which returns the voter to the summary page. The NEXT function 283 and the BACK function 286 of contest number two do not appear as the voter is required to return to the summary page after making any necessary changes. Actuation of the EXIT function and subsequent confirmation causes the selection process to be terminated, and the ballot to be returned to the voter at 271. Execution of the RETURN function 307 causes a return to the summary page with the contest number two selections 301 highlighted but not selected.

Actuation of the ACCEPT function 303 within the summary page causes the ballot to be marked at 308 and a message to be conveyed to the voter at 309 that the ballot has been marked and is being returned at 271. Alternatively, a confirmation page may be represented wherein the voter is requested to confirm his or her decision to mark the ballot prior to the ballot being marked by terminal 30.

In the event that a marked ballot is received by ballot marking terminal 30, the terminal reverts to a summary mode wherein results of contest number one are displayed at 310, the results of contest number two are displayed at 311 (FIG. 22*a*) and the results of contest number three are displayed at 312. No other functions are available except RETURN BALLOT at 313, which, if properly selected, causes the ballot to be returned at 271 in the same condition as received. Alternatively, additional functions could be added in the event a marked ballot is received, including returning to selected ones of the three contests to provide a review of all of the candidates present in the selected contest, and to provide high contrast and zoom functions otherwise unavailable on the summary page.

Thus, ballot marking terminal 30 employs a voter interface scheme that allows efficient voting utilizing touch screen 141, keypad 33 or a two-contact "sip and puff" connection at ADA port 54.

Figure 24:
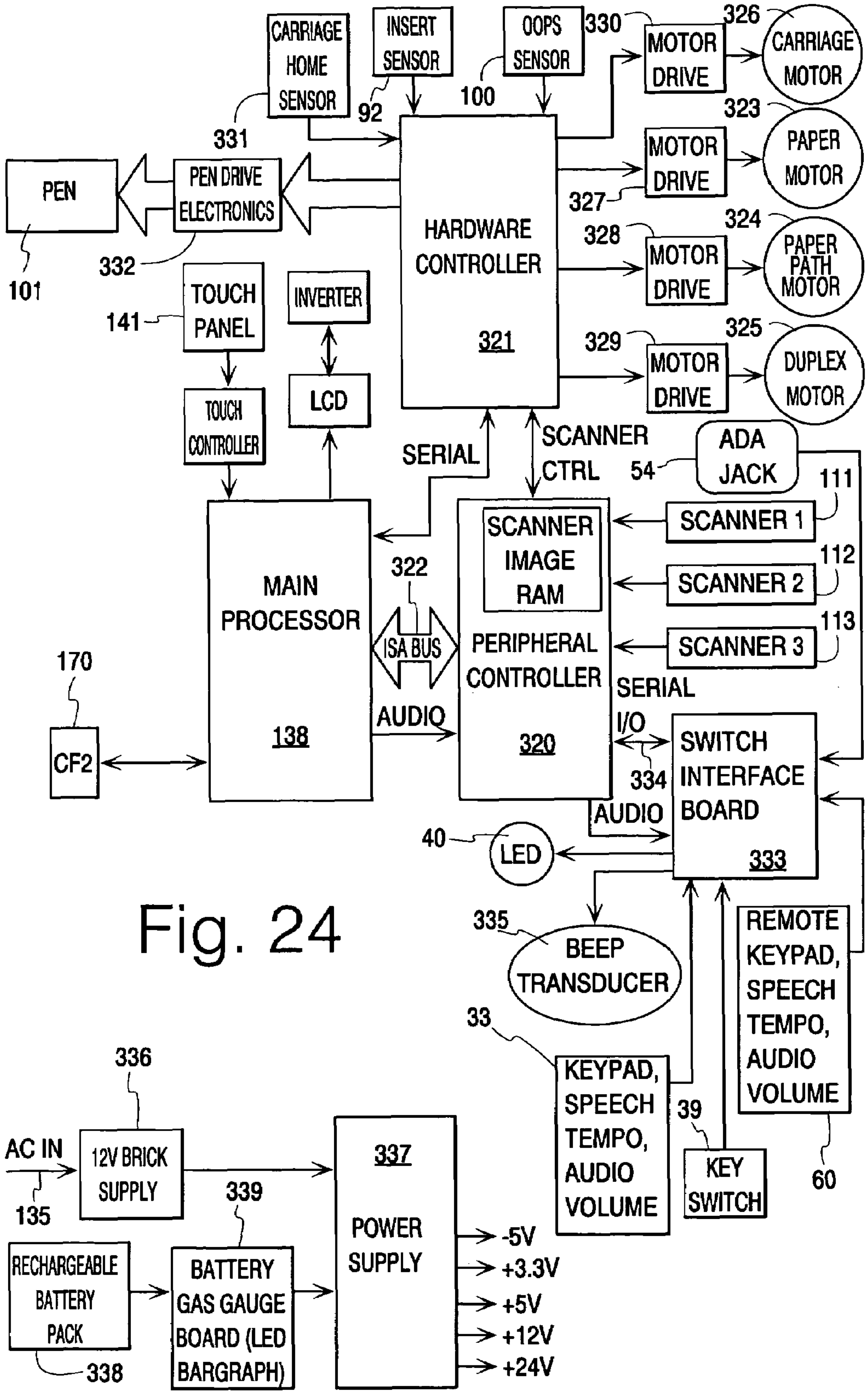
FIG. 24 is a simplified block diagram showing the principal circuits and components of the ballot marking terminal of FIGS. 1 and 2.

Referring to FIG. 24, the various functions of ballot marking terminal 30 are controlled by a main processor 138, a peripheral controller and a hardware controller 321. Processor 138 communicates with peripheral controller 320 by means of an ISA bus 322 and a parallel audio connection. Processor 138 communicates with the hardware controller 321 by means of a serial interface. Hardware controller 321 is responsible for controlling for three paper path motors 323, 324 and 325 and a carriage motor 326 which drives print head or pen 101. Conventional motor drive circuits 327, 328, 329 and 330 are provided to drive motors 323, 324, 325 and 326, respectively. Hardware controller 321 also receives inputs from the two paper position sensors 92 and 100 and a carriage home sensor 331. Pen 101 is actuated by convention pen drive electronics 332 in response to signals generated by hardware controller 321.

Peripheral controller 320 receives inputs from scanners 111, 112 and 113 and communicates with a switch interface board 333 by means of a serial I/O interface 334. Switch interface board 333 provides signals to the power supply/battery status LED 40, an optional beep key actuation transducer 335, keypad 33 and the remote keypad module 60. Key switch 39 also provides input to board 333. Power supplied to terminal 30 in a conventional manner, a 12-volt brick supply 336 providing power to a switching power supply 337 which generates the necessary voltages for operation of the various circuits of the terminal. A rechargeable battery pack 338 accessible through access door 132 provides power to the switching power supply 337. A battery gas gauge board 339 provides LED bar graph display (not shown) on the rear panel of the terminal to provide an indication of battery condition when the terminal is in storage.

While a particular embodiment of the invention has been shown and described, it will be obvious to those skilled in the art that changes and modifications may be made therein without departing from the invention in its broader aspects and, therefore, the aim of the appended claims is to cover all such changes and modifications as fall within the true spirit and scope of the invention.

I claim:

1. A voting system for recording a voter's selection of one candidate from a slate of one or more candidates, comprising a hand-markable physical ballot for receiving at least one voter-detectable mark indicating the voter's selection of a candidate from the slate of one or more candidates, said hand-markable physical ballot providing the names of and an associated marking space for each candidate in said slate of candidates;

a ballot marking terminal including a display screen for displaying to the voter one or more menus presenting a choice of candidates from said slate of candidates, and for receiving an input from the voter indicating the selection of a candidate from said slate of candidates, said ballot marking terminal receiving said hand-markable physical ballot and in response to said voter input, marking the marking space corresponding to said selected candidate with a voter-detectable mark and returning said hand-markable physical ballot to the voter; and a ballot scanning device for receiving said ballot and recording said voter-detectable mark in said marking space associated with said selected candidate as a vote cast for said selected candidate.

2. The voting system as defined in claim 1 wherein said hand-markable physical ballot is a paper ballot.

3. The voting system as defined in claim 2 wherein said ballot marking terminal includes a print head and said voter-detectable mark is a visually-detectable mark.

4. The voting system as defined in claim 1 wherein said menus presented to the voter are coordinated visual and aural menus.

5. The voting system as defined in claim 1 wherein said display screen comprises a touch screen display.

6. The voting system as defined in claim 1 wherein said ballot marking terminal includes a memory device for storing the physical location of each said associated marking space on said hand-markable physical ballot, and wherein said ballot marking terminal further responds to the locations stored on said memory device in marking each said marking space.

7. The voting system as defined in claim 6 wherein said memory device is removable from said ballot marking terminal.

8. In a voting system for recording a voter's selection of one candidate from a slate of one or more candidates on a hand-markable physical ballot for receiving one or more voter-detectable marks indicating a voter's selection of a candidate from a slate of one or more candidates, the hand-markable physical ballot providing the names of and an associated marking space for each candidate in said slate of candidates, the hand-markable physical ballot being readable by a ballot scanning device receiving the hand-markable physical ballot and recording the voter-detectable mark in the marking space associated with the selected candidate as a vote cast for the selected candidate, the improvement comprising:

a ballot marking terminal including a display screen for displaying to the voter one or more menus presenting a choice of candidates from the slate of candidates, and for receiving an input from the voter indicating the selection of a candidate from said slate of candidates, said ballot-marking terminal receiving the ballot and in response to said voter input to said ballot-marking terminal, marking a voter-detectable mark in the marking space corresponding to said selected candidate.

9. The voting system as defined in claim 8 wherein said hand-markable physical ballot is a paper ballot.

10. The voting system as defined in claim 9 wherein said ballot marking terminal includes a print head and said voter-detectable mark is a visually-detectable mark.

11. The voting system as defined in claim 8 wherein said menus presented to the voter are coordinated visual and aural menus.

12. The voting system as defined in claim 8 wherein said display screen comprises a touch screen display.

13. The voting system as defined in claim 8 wherein said ballot marking terminal includes a memory device for storing the physical location of each said associated marking space on said hand-markable physical ballot, and wherein said ballot marking terminal further responds to the locations stored on said memory device in marking each said marking space.

14. The voting system as defined in claim 13 wherein said memory device is removable from said ballot marking terminal.

15. A ballot marking terminal for use in conjunction with a hand-markable physical ballot for receiving at least one voter-detectable mark indicating a voter's selection of a candidate from a slate of one or more candidates, the hand-markable physical ballot providing the names of and an associated marking space for each candidate in the slate of candidates, the ballot marking terminal comprising:

a transport mechanism for receiving the hand-markable physical ballot;

a display screen to the voter one or more menus presenting a choice of candidates from the slate of candidates, and for receiving an input from the voter indicating the voter's selection of a candidate from the slate of candidates; and a marking head responsive to the voter input for providing a voter-detectable mark in the marking space corresponding to the selected candidate.

16. The ballot marking terminal as defined in claim 15 wherein said hand-markable physical ballot is a paper ballot.

17. The ballot marking terminal as defined in claim 15 wherein said menus presented to the voter are coordinated visual and aural menus.

18. The ballot marking terminal as defined in claim 15 wherein said display screen comprises a touch screen display.

19. The ballot marking terminal as defined in claim 15 wherein said ballot marking terminal includes a memory device for storing the physical location of each said marking space on said hand-markable physical ballot, and wherein said ballot marking terminal further responds to the locations stored on said memory device in marking each said marking space.

20. The voting system as defined in claim 19 wherein said memory device is removable from said ballot marking terminal.

21. A method for recording a voter's selection of one candidate from a slate of one or more candidates, comprising the steps of:

providing a hand-markable physical ballot for receiving at least one voter-detectable mark indicating the voter's selection of a candidate from the slate of one or more candidates, the hand-markable physical ballot providing the names of and an associated marking space for each candidate in the slate of candidates;

providing to the voter by means of a ballot marking terminal including a display screen for displaying to the voter one or more menus presenting a choice of candidates from the slate of candidates, and receiving an input from the voter indicating the selection of a candidate from the slate of candidates;

the ballot marking terminal in response to the voter input marking a voter-detectable mark in the marking space corresponding to the selected candidate; and receiving the hand-markable physical ballot in a ballot scanning device and recording the voter-detectable mark in the marking space associated with the selected candidate as a vote cast for the selected candidate.

22. The method defined in claim 21 wherein said hand-markable physical ballot is a paper ballot.

23. The method defined in claim 22 wherein said ballot marking terminal includes a print head, and said voter-detectable mark is a visually-detectable mark.

24. The method as defined in claim 21 wherein said display screen comprises a touch screen display.

25. The method as defined in claim 21 further including the steps of storing on a memory device within said ballot marking terminal the location of each said marking space, and the ballot marking terminal further responding to said location stored on said memory device when marking said marking space.

26. The voting system as defined in claim 25 wherein said memory device is removable from said ballot marking terminal.

27. A ballot marking terminal for use in conjunction with at least first and second different hand-markable physical ballots, said first hand-markable ballot containing a first ballot format code and providing a first slate of one or more candidates for selection, said second hand-markable ballot containing a second ballot format code and providing a second slate of one or more candidates for selection different from said first slate of candidates, each of said hand-markable physical ballots receives at least one voter-detectable mark indicating a voter's selection of a candidate from the respective slate of candidates, said terminal comprising:

a ballot transport mechanism for receiving one of said hand-markable physical ballots from the voter;

a memory device for storing said first and second hand-markable physical ballot format data in association with said first and second ballot format codes, respectively;

a ballot interface device for reading the format codes on said hand-markable physical ballot received by said transport mechanism;

a display screen responsive to the format code read by said ballot interface device and the associated format data in said memory device for providing to the voter one or more menus presenting a choice of candidates from the slate of candidates provided on the received ballot;

the display screen receiving an input from the voter indicating the voter's selection of a candidate from the slate of candidates;

a marking device responsive to said voter input and said associated format data from said memory device for marking said received ballot to indicate the candidate selected by the voter; and said ballot transport mechanism returns the marked ballot to the voter.

28. The ballot marking terminal as defined in claim 27 wherein said menus provided to the voter are coordinated visual and aural menus.

29. The ballot marking terminal as defined in claim 27 wherein said hand-markable physical ballots are paper ballots, and said format codes comprise printing on said hand-markable physical ballots.

30. The ballot marking terminal as defined in claim 29 wherein said ballot interface device comprises an optical scanner.

31. The ballot marking terminal as defined in claim 27 wherein said user interface provides both visual and aural menus to the voter.

32. The ballot marking terminal as defined in claim 27 or 31 wherein said user interface comprises a touch screen display.

33. The ballot marking terminal as defined in claims 27 or 31 wherein said user interface includes voter-actuable UP, DOWN, and SELECT key switches for receiving said voter input from said menu.

34. The ballot marking terminal as defined in claims 27 or 31 wherein said user interface includes voter-actuable UP, DOWN, FORWARD, BACK and SELECT key switches for receiving said voter input from said menu.

35. The ballot marking terminal as defined in claims 27 or 31 wherein said user interface includes an ADA input providing a uni-directional closed-loop scrolling function through said menu and a select function for receiving a voter selection from said menu.

36. The ballot marking terminal as defined in claim 27 wherein said hand-markable physical ballots each include a marking space in association with each of said candidates, and said ballot interface device comprises a scanner which scans said marking spaces on said hand-markable physical ballot received by said ballot transport mechanism, and said user interface is inhibited from receiving a voter input in the event of one or more of said marking spaces being marked.

37. The ballot marking terminal as defined in claim 27 wherein said hand-markable physical ballots each include a marking space in association with each of said candidates, and said ballot interface device comprises a scanner which scans said marking spaces on said ballot received by said ballot transport mechanism, said marking device being further responsive to the location of said marking spaces as sensed by said ballot interface device for marking said received ballot.

38. The ballot marking terminal as defined in claim 27 wherein said hand-markable physical ballots each include a marking space in association with each of said candidates, and said ballot interface device comprises a scanner which scans said marking spaces on said ballot received by said ballot transport mechanism, said ballot marking terminal includes an analysis circuit for analyzing the output of said scanner for physical irregularities in said received ballot, and said ballot transport mechanism rejects a hand-markable physical ballot having physical irregularities in response to a control effect from said analysis circuit.

39. The ballot marking terminal as defined in claim 27 wherein said memory device is a flash card.

40. A voting system for recording a voter's selection of one candidate from a slate of one or more candidates, comprising:

a first hand-markable physical ballot containing a first format code and providing a first slate of one or more candidates;

a second hand-markable physical ballot containing a second format code and providing a second slate of one or more candidates different from said first slate of candidates;

each of said hand-markable physical ballots receives at least one voter-detectable mark indicating a voter's selection of a candidate from the respective slate of candidates;

a ballot marking terminal comprising a ballot transport mechanism for receiving one of said hand-markable physical ballots from the voter;

a memory device within said ballot marking terminal for storing first and second sets of ballot format data in association with said first and second ballot format codes, respectively;

a ballot interface device within said ballot marking terminal for reading the format codes on said hand-markable physical ballot received by said ballot transport mechanism;

a user interface within said ballot marking terminal responsive to the format code read by said ballot interface device and the associated format data in said memory device for providing to the voter one or more menus presenting a choice of said candidates from the slate of candidates provided on the received ballot;

said user interface receiving an input from the voter indicating the voter's selection of a candidate from the slate of candidates;

a marking device within said ballot marking terminal responsive to said voter input and said associated set of format data from said memory device for marking said received ballot to indicate the candidate selected by the voter;

said ballot transport mechanism returns the marked ballot to the voter; and a ballot scanning device for receiving said selected ballot and recording said voter-detectable mark in the marking space associated with the selected candidate as a vote for the selected candidate.

41. The voting system as defined in claim 40 wherein said menus provided to the voter are coordinated visual and aural menus.

42. The voting system as defined in claim 40 wherein said hand-markable physical ballots are paper ballots, and said format codes comprise printing on said hand-markable physical ballots.

43. The voting system as defined in claim 42 wherein said ballot interface device comprises an optical scanner.

44. The voting system as defined in claim 40 wherein said user interface provides both visual and aural menus to the voter.

45. The voting system as defined in claim 40 or 44 wherein said user interface comprises a touch screen display.

46. The voting system as defined in claims 40 or 44 wherein said user interface includes voter-actuable UP, DOWN, and SELECT key switches for receiving said voter input from said menu.

47. The voting system as defined in claims 40 or 44 wherein said user interface includes voter-actuable UP, DOWN, FORWARD, BACK and SELECT key switches for receiving said voter input from said menu.

48. The voting system as defined in claims 40 or 44 wherein said user interface includes an ADA input providing a uni-directional closed-loop scrolling function through said menu and a select function for receiving a voter selection from said menu.

49. The voting system as defined in claim 40 wherein said hand-markable physical ballots each include a marking space in association with each of said candidates, and said ballot interface device comprises a scanner which scans said marking spaces on said hand-markable physical ballot received by said ballot transport mechanism, and said user interface is inhibited from receiving a voter input in the event of one or more of said marking spaces being marked.

50. The voting system as defined in claim 40 wherein said hand-markable physical ballots each include a marking space in association with each of said candidates, and said ballot interface device comprises a scanner which scans said marking spaces on said hand-markable physical ballot received by said ballot transport mechanism, said marking device being further responsive to the location of said marking spaces as sensed by said ballot interface device for marking said received ballot.

51. The voting system as defined in claim 40 wherein said hand-markable physical ballots each include a marking space in association with each of said candidates, and said ballot interface device comprises a scanner which scans said marking spaces on said hand-markable physical ballot received by said ballot transport mechanism, said ballot marking terminal includes an analysis circuit for analyzing the output of said scanner for physical irregularities in said received ballot, and said ballot transport mechanism rejects a ballot having physical irregularities in response to a control effect from said analysis circuit.

52. The voting system as defined in claim 40 wherein said memory device is a flash card.

53. A method of recording a voter's selection of one candidate from a slate of one or more candidates, comprising the steps of:

providing a first hand-markable physical ballot containing a first format code and providing a first slate of one or more candidates;

providing a second hand-markable physical ballot containing a second format code and providing a second slate of one or more candidates different from said first slate of candidates;

each of said hand-markable physical ballots receives at least one voter-detectable mark indicating a voter's selection of a candidate from the respective slate of candidates; providing a ballot marking terminal including a ballot transport mechanism receiving one of said hand-markable physical ballots from the voter;

storing within said ballot marking terminal first and second sets of ballot format data in association with said first and second ballot format codes, respectively;

reading the format codes on said hand-markable physical ballot received by said ballot transport mechanism;

providing to the voter a user interface within said ballot marking terminal responsive to the format code read by said ballot interface device and the associated format data in said memory device one or more menus presenting a choice of said candidates from the slate of candidates provided on the received hand-markable physical ballot; receiving an input from the voter indicating the voter's selection of a candidate from the slate of candidates;

marking said received hand-markable physical ballot responsive to said voter input and said associated set of format data from said memory device to indicate the candidate selected by the voter;

returning the marked ballot to the voter; and scanning said selected hand-markable physical ballot and recording said voter-detectable mark in the marking space associated with the selected candidate as a vote for the selected candidate.

54. The method of voting as defined in claim 53 including the additional step of providing are coordinated visual and aural menus to the voter.

55. The method of voting as defined in claim 53 including the additional step of providing paper ballots, and printing said format codes on said ballots.

56. The method of voting as defined in claim 55 wherein said ballot format codes are read by optical scanning.

57. The method of voting as defined in claim 53 including the additional steps of providing a marking space on said hand-markable physical ballots in association with each of said candidates, scanning said marking spaces on said hand-markable physical ballot received by said ballot transport mechanism, and inhibiting voter input in the event one or more of said marking spaces is marked.

58. The method of voting as defined in claim 53 including the additional steps of providing a marking space on said hand-markable physical ballots in association with each of said candidates, scanning said marking spaces on said hand-markable physical ballot received by said ballot transport mechanism, and marking said received hand-markable physical ballot responsive to the location of said marking spaces as sensed by said scanning.

59. The method of voting as defined in claim 53 including the additional steps of providing a marking space on said hand-markable physical ballots in association with each of said candidates, and scanning said marking spaces on said hand-markable physical ballot received by said ballot transport mechanism, analyzing the output of said scanner for physical irregularities in said received hand-markable physical ballot, and rejecting a hand-markable physical ballot having physical irregularities in response to said analysis.

60. The method of voting as defined in claim 53 including the additional steps of storing said ballot format data in a flash card.

* * * * *